US011222183B2

(12) United States Patent
Downs et al.

(10) Patent No.: US 11,222,183 B2
(45) Date of Patent: Jan. 11, 2022

(54) CREATION OF COMPONENT TEMPLATES BASED ON SEMANTICALLY SIMILAR CONTENT

(71) Applicant: Open Text Holdings, Inc., San Mateo, CA (US)

(72) Inventors: James Matthew Downs, Lexington, KY (US); Anthony Wiley, Rancho Santa Fe, CA (US)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 12 days.

(21) Appl. No.: 16/791,632

(22) Filed: Feb. 14, 2020

(65) Prior Publication Data

US 2021/0256216 A1 Aug. 19, 2021

(51) Int. Cl.
*G06F 40/30* (2020.01)
*G06F 40/186* (2020.01)
*G06F 40/289* (2020.01)

(52) U.S. Cl.
CPC ............ *G06F 40/30* (2020.01); *G06F 40/186* (2020.01); *G06F 40/289* (2020.01)

(58) Field of Classification Search
CPC ....... G06F 40/30; G06F 40/289; G06F 40/186
USPC .......................................................... 704/9
See application file for complete search history.

(56) References Cited

U.S. PATENT DOCUMENTS

| | | | |
|---|---|---|---|
| 6,917,952 B1 * | 7/2005 | Dailey | G06F 40/35 |
| 8,204,736 B2 * | 6/2012 | Emam | G06F 40/237 |
| | | | 704/8 |
| 8,782,805 B2 * | 7/2014 | Zhang | G06F 16/3341 |
| | | | 726/30 |
| 10,552,107 B2 | 2/2020 | Downs et al. | |
| 2001/0013045 A1 | 8/2001 | Löschky et al. | |
| 2004/0102958 A1 | 5/2004 | Anderson, IV | |
| 2005/0060643 A1 | 3/2005 | Glass et al. | |
| 2006/0101069 A1 * | 5/2006 | Bell | G06F 40/30 |
| 2009/0070101 A1 * | 3/2009 | Masuyama | G06F 16/334 |
| | | | 704/9 |

(Continued)

OTHER PUBLICATIONS

International Search Report and Written Opinion issued for PCT Application No. PCT/US2015/063424, dated Aug. 6, 2016, 11 pages.

(Continued)

*Primary Examiner* — Hassan Mrabi
(74) *Attorney, Agent, or Firm* — Sprinkle IP Law Group

(57) ABSTRACT

Systems, methods and products for accessing a set of electronic document templates, identifying instances of common document content such as content items which are semantically similar, and generating component templates containing the common content. Semantically similar content may be identified by analyzing content for factors such as expressed sentiment, included keyphrases, recognizable entities, expressed topics, assigning values to content based on these factors, and determining similarity based on comparisons of the assigned values. Component templates may also be generated based on types of content that include identical text or images, content that has a predefined level of similarity rather than being identical, content that has common rules, scripting logic or variables, metadata, etc. The component templates may be generated automatically, or in response to user instructions.

20 Claims, 17 Drawing Sheets

(56) References Cited

U.S. PATENT DOCUMENTS

| | | | |
|---|---|---|---|
| 2010/0306204 A1 | 12/2010 | Chitiveli et al. | |
| 2011/0055332 A1* | 3/2011 | Stein | H04L 51/12 |
| | | | 709/206 |
| 2011/0191325 A1 | 8/2011 | Dexter et al. | |
| 2014/0033010 A1 | 1/2014 | Richardt et al. | |
| 2017/0308517 A1 | 10/2017 | Josifovski et al. | |
| 2018/0300296 A1* | 10/2018 | Ziraknejad | G06F 16/93 |
| 2018/0364960 A1* | 12/2018 | Downs | G06F 3/1204 |
| 2020/0125309 A1 | 4/2020 | Downs et al. | |

OTHER PUBLICATIONS

International Preliminary Report on Patentability issued for PCT Application No. PCT/US2015/063424, dated Jun. 14, 2018, 10 pages.

Office Action issued for U.S. Appl. No. 15/780,698, dated Apr. 15, 2019, 13 pages.

Notice of Allowance issued for U.S. Appl. No. 15/780,698, dated Sep. 26, 2019, 10 pages.

Office Action issued for U.S. Appl. No. 16/723,651, dated Apr. 1, 2020, 11 pages.

Office Action issued for U.S. Appl. No. 16/723,651, dated Aug. 24, 2020, 12 pages.

Office Action issued for U.S. Appl. No. 16/723,651, dated Dec. 14, 2020, 12 pages.

Notice of Allowance issued for U.S. Appl. No. 16/723,651, dated Mar. 19, 2021, 11 pages.

* cited by examiner

CREATION OF COMPONENT TEMPLATES BASED ON SEMANTICALLY SIMILAR CONTENT

TECHNICAL FIELD

This disclosure relates generally to management of content and communications, and more particularly to systems, methods and products for identifying common content such as semantically similar content in electronic document templates and creating component templates based on the identified common content.

BACKGROUND

Multichannel customer communication management (CCM) applications enable a designer user to create customized communication documents for delivery to clients of an enterprise through channels such as web, email, print, and SMS. In this manner the designer user can produce and send account statements, bills, and other documents that are tailored to individual clients. Such personalized, multichannel document communications can enable the enterprise to experience cost savings in the areas of document development and production, while maximizing the impact of its enterprise to client communications.

SUMMARY

Embodiments of the invention include systems, methods and products for accessing a set of electronic document templates, identifying instances of common document content such as content items which are semantically similar, and generating component templates containing the common content. Semantically similar content may be identified by analyzing content for factors such as expressed sentiment, included keyphrases, recognizable entities, expressed topics, assigning values to content based on these factors, and determining similarity based on comparisons of the assigned values. Component templates may also be generated based on types of content that include identical text or images, content that has a predefined level of similarity rather than being identical, content that has common rules, scripting logic or variables, metadata or the like. The component templates may be generated automatically, or in response to user instructions.

One embodiment comprises a system for creation of component templates, including an identification engine and a component template engine. The identification engine is configured to access a set of electronic document templates and identify semantically similar content instances contained in two or more electronic document templates of the set of electronic document templates. The component template engine is configured to create and store the component template corresponding to the two or more electronic document templates of the set of electronic document templates, either automatically, or in response to receipt of data indicative of a user instruction. The component template contains the semantically similar content instances identified in the two or more electronic document templates and enables new documents to be generated from the component template.

In one embodiment, the identification engine is configured to analyze content for each electronic document template and determine a sentiment associated with each electronic document template, which can then be compared to the sentiment of other electronic document templates. The identification engine may also be configured to analyze content of each electronic document template to recognize entities identified in the content, and to compare the recognized entities as similarity factors between the electronic document templates. The identification engine may further be configured to analyze content of each electronic document template to identify keyphrases contained therein, and to compare the keyphrases as a factor contributing to similarity between the electronic document templates. Still further, the identification engine may be configured to analyze the content of each electronic document template to identify topics expressed therein, and to compare the topics as a similarity factor between the electronic document templates.

In one embodiment, identifying the semantically similar content instances between two electronic document templates comprises computing a semantic distance between content in the templates. The semantic distance may be determined based on one or more of the semantic similarity factors of sentiment, keyphrases, recognized entities and topics. In one embodiment, values for each of these factors are computed and stored. The values for two content items can then be used to compute similarity values between the content items, and these similarity values can be weighted and combined to generate a combined similarity value which represents the similarity of two content items. If the similarity value reaches a threshold value, the content items may be considered semantic matches.

One alternative embodiment comprises a memory resource storing instructions which, when executed, cause a processing resource to create component templates in a manner similar to that described for the system above. Another alternative embodiment comprises a method for creating component templates in a similar manner. Numerous other alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
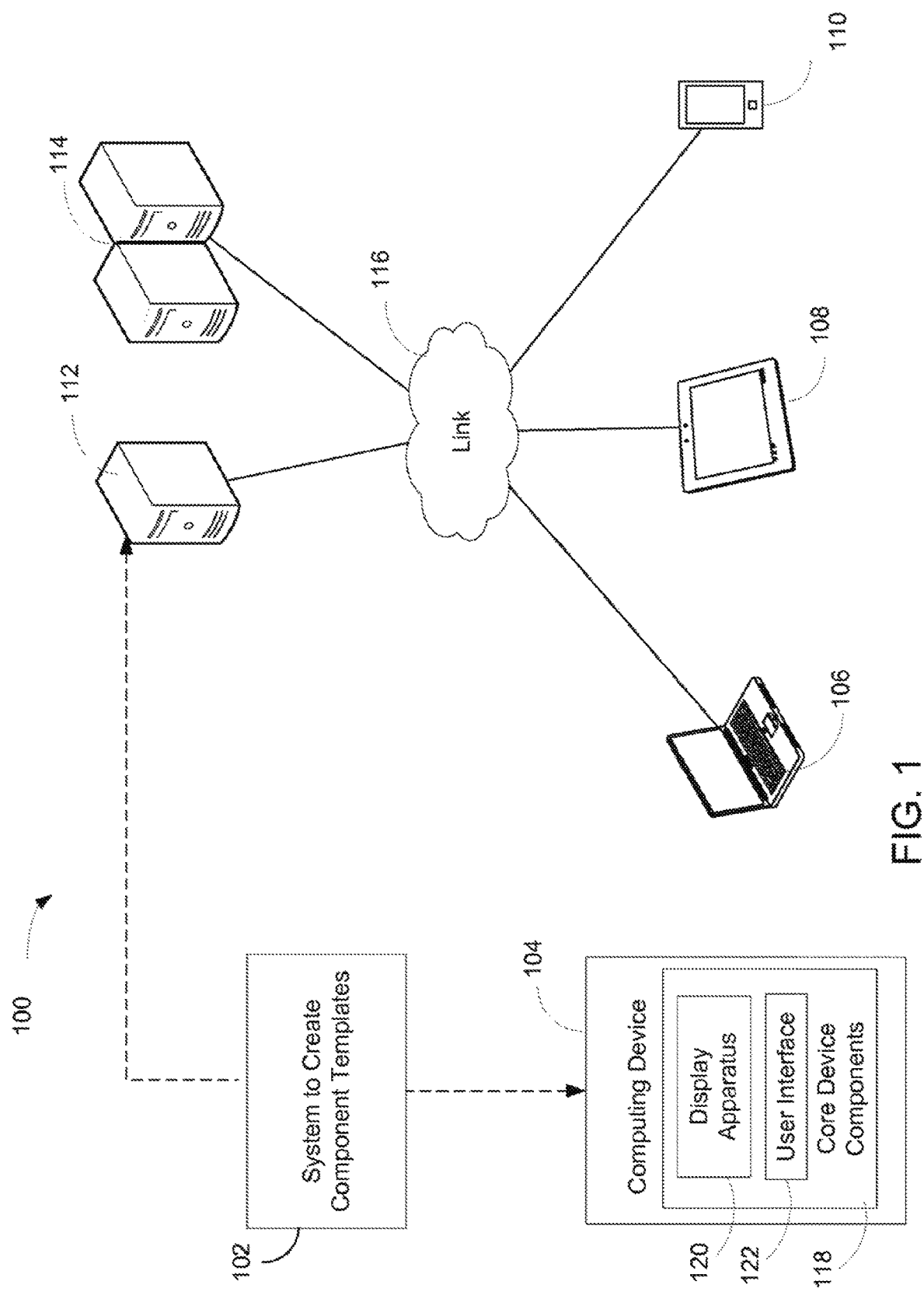
FIG. 1 is a block diagram depicting an exemplary environment in which various examples of the disclosure may be implemented.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

INTRODUCTION

Designer users of CCM applications can create rich client communication documents as templates, or compilation of templates, in the style of forms, letters, policies, proposals, memos, or other document types or structures. Designer users for a single enterprise may create thousands of templates. In one example, multiple templates can be created as a source document is localized to many languages and customized for different regions of the world. For instance, an insurance letter sent by an enterprise to a client in New York may have different text or other content differences compared to an insurance letter sent to London due to translation and due to different legal requirements of each geography.

The exponential growth of these templates as design users utilize CCM applications can pose significant challenges to an enterprise, however. The enterprise's documents to be sent to clients typically evolve over time due to changing needs, resulting in multiple versions of templates. When a new letter or other document is needed, a design user will often simply copy an existing template and modify it to suit the new needs. This can result in duplicate content which can become expensive to maintain in terms due to the user resources required to maintain the swelling template library of templates. Such a process can also pose security issues with respect to personal information, as client information may be inadvertently stored as part of old templates. Additionally, as some of the templates may be stored in non-human-readable formats, designer users may have additional difficulties in identifying and working with duplicate templates.

To address these issues, various examples described in more detail below provide systems, methods and products for creating component templates which contain content that is common to two or more of the previous templates, and can replace the common content in the previous templates. This reduces the duplication of content in the collection of templates so that the templates require less resources, are less expensive to maintain, pose less security risks, and decrease the difficulty of working with the different templates.

In one example, a set of electronic document templates is accessed and instances of duplicated or common document content are identified. This common content may include content that does not have identical text or images, but which is semantically similar (e.g., has similar semantic characteristics such as having similar sentiments or topics, or including matching keyphrases or entities). A user notice for first common document content is caused to be displayed. In examples, the common content may be duplicated text, a duplicated image, duplicated rules, duplicated scripting logic and/or variables, a duplicated document structure identified in a first document and a second document of the set of electronic document templates, or text or images that are semantically similar. A component template for the first common content is created and stored responsive to receipt of data indicative of a user instruction to create the component template. The stored template can then be accessed by designer users working on new or distinct projects.

In certain examples, the first common content is content of a first document of the set of electronic document templates that is determined to be within a pre-defined degree of similarity of content of a second document of the set of electronic document templates. The similarity of the content may be determined based on the meanings of the respective content, as indicated by semantic information representing sentiment of the content, keyphrases contained in the content, entities identified in the content, and/or topics described by the content. In other examples, the first common content may be identical content that is identified in a first document and a second document of the set of electronic document templates.

In some examples, the component template may be created to include a user-selected version of the first common content that was selected by a user as between the first common content and the second common content.

In certain examples, a plurality of component templates stored in a database that serves as a component template library may be analyzed to identify as dead content in the templates content that was not utilized by a subject application within a specified time period, and the dead content may be deleted from the component templates.

In certain examples, a design rule test may be executed or run upon the created component template and to, responsive to a determination of a violation or failure of the design rule test, a user notice indicative of the violation or failure may be provided.

In certain examples, a performance rule test of incorporation of the created component template into another set of electronic document templates may be executed or run. Responsive to receipt of data indicative that a design rule violation was caused by the incorporation of the component template into the set of templates, a user notice indicative of the design rule violation may be provided. In certain examples in which the created component template is stored in a database, a subject document may be analyzed to identify a set of subject document sections. In certain examples the subject document is a new document that has not been previously analyzed to identify subject document sections. The database may be searched to determine that the first component template in the database is common to a first section of the subject document. Component templates for the set of identified subject document sections may then be created and stored at the database, except for the first subject document section that was already present in the database.

In this manner, the disclosed examples provide for an efficient and easy to use method and system for creation of component templates. The disclosed examples thus enable easy identification of inefficiencies caused by duplicative document designs, intelligent creation of component templates, and storage of the created templates in template libraries accessible to the designer users during project development. Users of CCM applications and other applications should each appreciate the reduced costs, time savings, and increased document quality to be enjoyed with utilization of the disclosed examples relative to manual creation and maintenance of template libraries.

Environment

FIG. 1 depicts an example environment 100 in which examples may be implemented as a system 102 for creating component templates. Environment 100 is shown to include computing device 104, client devices 106, 108, and 110, server device 112, and server devices 114. Components 104-114 are interconnected via link 116.

Link 116 represents generally an infrastructure or combination of infrastructures to enable an electronic connection, wireless connection, other connection, or combination thereof, to enable data communication between components 104-114. Such infrastructure or infrastructures may include, but are not limited to, a cable, wireless, fiber optic, or remote connections via telecommunication link, an infrared link, or a radio frequency link. For example, link 116 may represent the internet, intranets, and intermediate routers, switches, and other interfaces. As used herein, a "computing device" may be a server, computer networking device, chip set, desktop computer, notebook computer, workstation, tablet computer, smartphone or another processing device or equipment. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106, 108, and 110 represent generally a computing device with which a user may interact to communicate with other client devices, server device 112, and/or server devices 114 via link 116. Server device 112 represents generally a computing device to serve a program and corresponding data for consumption by components 104-110 and 114. Server devices 114 represent generally a group of computing devices collectively to serve a program and corresponding data for consumption by components 104-110 and 112.

Computing device 104 represents generally a computing device with which a user may interact to communicate with client devices 106-110, server device 112, and/or server devices 114 via link 116. Computing device 104 is shown to include core device components 118. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally a combination of hardware and programming to exhibit or present a message, image, view, or other presentation for perception by a user, and can include, but is not limited to, a visual, tactile or auditory display. In examples, the display apparatus 120 may be or include a monitor, a touchscreen, a projection device, a touch/sensory display device, or a speaker. User interface 122 represents generally a combination of hardware and programming to enable interaction between a user and device 104 such that the user may effect operation or control of device 104. In examples, user interface 122 may be, or include, a keyboard, keypad, or a mouse. In some examples, the functionality of display apparatus 120 and user interface 122 may be combined, as in the case of a touchscreen apparatus that may enable presentation of displays of electronic documents or images at device 104, and that also may enable a user to operate or control functionality of device 104.

System 102, discussed in more detail below, represents generally a combination of hardware and programming to create component templates. In some examples, system 102 may be wholly integrated within core device components 118. In other examples, system 102 may be implemented as a component of computing device 104, client devices 106-110, server device 112, or server devices 114 where it may take action based in part on data received from core device components 118 via link 116. In other examples, system 102 may be distributed across computing device 104, client devices 106-110, server device 112, or server devices 114. In one example, components that implement functionality of identification engine 202, notice engine 204, and component template engine 206 may be included within computing device 104, wherein components that implement functionality of dead content engine 208, design rule test engine 210, performance rule test engine 212, and document analysis engine 214 may be components included within a server device 112. Other distributions of system 102 across computing device 104, client devices 106-110, server device 112, and server devices 114 are possible and contemplated by this disclosure.

Components

Figure 2:
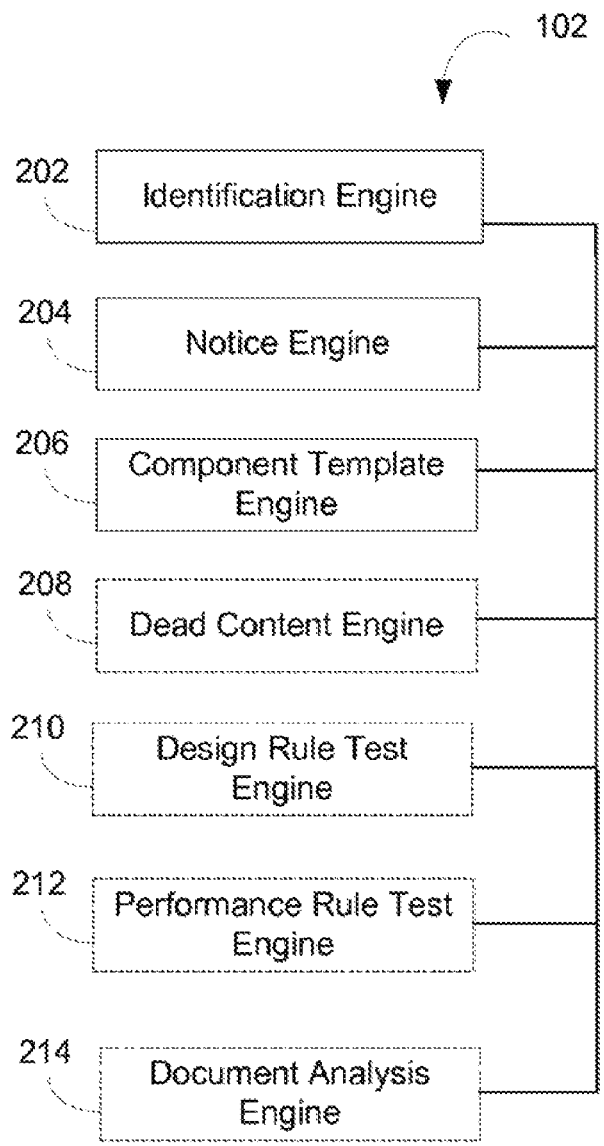
FIG. 2 is a block diagram depicting an example of a system to create component templates.
Figure 3:
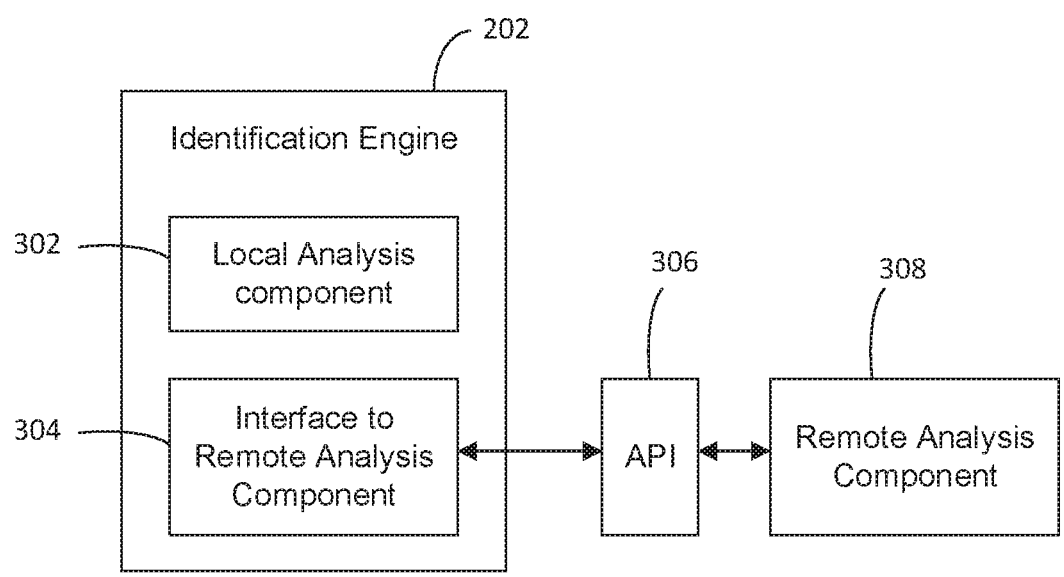
FIG. 3 is a block diagram depicting an example of an identification engine for identifying common document content in electronic document templates.

FIGS. 2 and 3 depict examples of physical and logical components for implementing various examples. In FIG. 2 various components are identified as engines 202, 204, 206, 208, 210, 212 and 214. In describing engines 202-214 focus is on each engine's designated function. However, the term engine, as used herein, refers generally to a combination of hardware and programming to perform a designated function. As is illustrated later with respect to FIG. 4, the hardware of each engine, for example, may include one or both of a processor and a memory, while the programming may be code stored on that memory and executable by the processor to perform the designated function.

FIG. 2 is a block diagram depicting components of a system 102 to enable creation of component templates. In this example, system 102 includes identification engine 202, notice engine 204, component template engine 206, dead content engine 208, design rule test engine 210, performance rule test engine 212, and document analysis engine 214. In performing their respective functions, engines 202-214 may access a data repository, e.g., a memory accessible to system 102 that can be used to store and retrieve data.

In one example, identification engine 202 represents generally a combination of hardware and programming to access a set of electronic document templates and identify instances of common document content. In examples, identification engine 202 may access the set of electronic data templates via a network, e.g., link 116 (FIG. 1). Identification engine 202 may also access external resources such as a text mining engine or other content analysis components via a network such as link 116, in order to analyze the content of the electronic data templates and to determine the semantic content of the electronic data templates for comparison by Identification engine 202. As used herein, a "document" refers generally to a collection of data that provides information or evidence, or that serves as a record. A document may be in electronic or hard copy form. An "electronic document" refers generally to a document in an electronic or soft copy format such that that can be interpreted by a computer or other electronic device to display, interpret, and process data included within the document. In examples an electronic document may be a document generated by a software and stored on magnetic media (disks) or optical media (CDs, DVDs). In other examples an electronic document may be a document transmitted by electronic means, e.g., by electronic mail or by electronic data interchange (EDI). A "hard copy" of a document refers generally to a printed version or copy of the document, including but not limited to a version or copy printed upon paper.

As used herein, a "document template" refers generally to a preset format, pattern, or model for a document, to be used so that the document does not have to be recreated each time it is needed. As used herein, an "electronic document template" refers generally to a document template for an electronic document. As used herein, document "content" refers generally to an element of a document that is displayable. In one example, content of an electronic document or component may be displayed at a display device as a web page, e.g., a web page from a website, is interpreted by a web browser. Content for an electronic document or component may be or include, but is not limited to, text, images, document structure, audio, and video. In another example, content of a hard copy document or hard copy component may be or include, but is not limited to, printed text, images, and document structure.

Continuing at FIG. 2, notice engine 204 represents generally a combination of hardware and programming to cause display of a user notice for first common document content that was identified by identification engine 202. In examples, notice engine 204 may send data to a computing device via a network, e.g., via link 116 (FIG. 1), to cause display of the user notice. As used herein, a "user notice" refers generally to a message that is displayed to inform a user. As used herein, "display" refers generally to exhibition or presentation caused by a computer for the purpose of perception by a user via an electronic display component. In examples, a display may be a display to be presented at a computer monitor, touchscreen, projection device, or other electronic display component. As used herein, a "display component" refers generally to a combination of hardware and programming to exhibit or present content, a message, or other information for perception by a user, and can include, but is not limited to, a visual, tactile or auditory display. In examples, the display may include a graphic user interface to enable user interaction with the display.

Component template engine 206 represents generally a combination of hardware and programming to receive data indicative of a user instruction to create a component template for the first common content that was identified by identification engine 202. Component template engine 206, in response receipt of such data, is to create and to store a component template for the first common content. As used herein, a "component" refers generally to a subset of a document. As used herein, a "component template" refers generally to a format, pattern, or model for a component, to be used so that the component does not have to be recreated each time it is needed. In one example, the received data may be indicative of a user instruction that was created or initiated by a user at a same computing device to which notice engine 204 caused display of the user notice that identified the common content. In one example, component template engine 206 may cause the created component template to be stored at a database that is accessible via a network, e.g. via link 116. As used herein, a "database" refers generally to any organized collection of data in digital form such that it can be stored in computer memory or a data storage device. In examples, a database may be a collection of data organized according to files, folders, outline headers or other organizational containers or units. In certain examples, a database may support report, view, table or other query functionality to enable a design user to search for and retrieve created component templates that are stored in the database.

Continuing at FIG. 2, identification engine 202 may identify document content that is common to a set of electronic document templates, where the common document content may be determined in several different ways. In one example, identification engine 202 may identify first common document content that is duplicated text among documents included in the set of electronic document templates. In another example, identification engine 202 may identify first common document content that is a duplicated image included in the set of electronic document templates. As used herein, an "image" refers generally to a rendering of an object, scene, person, or abstraction such as text or a geometric shape. In still another example, identification engine 202 may identify first common document content that comprises duplicated rules, or duplicated scripting logic and/or variables among documents included in the set of electronic document templates. In yet another example, identification engine 202 may identify first common document content that is duplicated document structure among documents included in the set of electronic document templates. As used herein, a "document structure" refers generally to a construction, arrangement, or configuration of structural elements of a document including, but not limited to arrangement of paragraphs and sections of the document. In another example, identification engine 202 may identify first common document content that is semantically similar content included in the set of electronic document templates. As used herein, "semantically similar content" refers generally to content such as text or images that are not explicitly duplicative, but which match semantically in one or more ways, including, but not limited to expressing the same or similar sentiment, identifying or describing matching entities, containing matching keyphrases, or concerning the same topics.

In one embodiment, the semantic content of a document template is determined by a combination of factors, each of which may be represented by a corresponding value. The values for each of the factors may be stored in an array or vector of values. The semantic similarity of two template documents may be determined by comparing the respective values in the corresponding vectors to determine the similarity of the template documents with respect to each of the factors. The degree of similarity for each of the factors may itself be represented by a corresponding similarity value. An overall degree of semantic similarity between the template documents may then be determined by, for example, adding the similarity values for each of the factors. In one embodiment, the similarity values for each of the factors may be weighted (i.e., multiplied by a corresponding weighting factor before being summed with the other similarity values.

In one example, identification engine 202 may identify common document content that is identical among documents included in the set of electronic document templates. In another example, identification engine 202 may identify first common document content that is common content among documents included in the set of electronic document templates by determining that content (e.g., text, an image, or a document structure) of a first document of the set of electronic document templates is not identical, but is within a pre-defined degree of similarity of content with respect to a second document of the set of electronic document templates. For example, textual content may be determined to be within a pre-defined degree of similarity if a predetermined percentage of the content (e.g., 90%, or 9 out of 10 words) is identical.

In one example in which identification engine 202 identifies first common document content that is shared content among documents included in the set of electronic document templates on the basis of a pre-defined degree of similarity, component template engine 206 may identify from the set of documents a comprehensive version of the first common content that includes the greatest number of display elements as among the set of versions of the common content. In different examples, the display elements to be counted to determine the most comprehensive version of the first common content may be or include characters, words, or structural elements (including, but not limited to lines, paragraphs, and sections) of the first common content being analyzed.

In another example in which identification engine 202 identifies first common document content that is shared content among documents included in the set of electronic document templates on the basis of a pre-defined degree of similarity, component template engine 206 may create the component template to include a user-selected version of the first common content. For instance, component template engine 206 may present a design user, via a display component, with a set of variations of first common content that are similar enough to be deemed common on the basis of having a pre-defined degree of similarity in each of the variations, and may present the design user with a graphic user interface to enable the user to select a most desirable version among the variations. Continuing with this example, component template engine 206 may receive the user selection of a most desirable version as between the first common content and the second common content, and may then proceed to create the component template to include the version of the first common content that was selected by a user as between the first common content and the second common content.

In certain examples, system 102 may additionally include a dead content engine 208. Dead content engine 208 represents generally a combination of hardware and programming to analyze a set of component templates stored in a component template library to identify as dead content included in content templates and not utilized by a subject application within a specified time period. Dead content engine 208 is to in turn delete the identified dead content from the component templates. In this manner, system 102 after having identified common content and created component templates stored in a component template library, may crop or prune the component template to eliminate the dead content. In a particular example, dead content engine 208 is to cause display of a user alert descriptive of the dead content, and is to delete the dead content from the component templates responsive to receipt of data indicative of a user instruction to delete. In examples, the display may be caused to occur at a computing device that is utilized by a designer user and is in electronic communication with system 102 via a network, e.g., link 116. As used herein, a "designer user" refers generally to a user that utilizes an application, e.g., a CCM application, to design documents or document templates.

In certain examples, system 102 may additionally include a design rule test engine 210. Design rule test engine 210 represents generally a combination of hardware and programming to execute or run a design rule test upon the component template and to, responsive to a determination of violation or failure of the design rule, cause provision of user notice indicative of the violation or failure. As used herein, a "design rule test" refers generally to a test to identify occurrences of violation or compliance with a design rule that has been established for the tested component template. In examples, the design rule test may test for violation of design rules including, but not limited to, design rules regarding fonts, font styles, colors, font size, font effects, character spacing, line spacing, margins, bullet format, numbered paragraph format, page breaks, headers, footers, page numbers, watermarks, page layout, tables, margins, word counts and/or footnotes. In examples, the design rules utilized in the design rule test may be stored as a document at a memory component accessible to system 102 via a network, e.g., link 116.

In certain examples, system 102 may additionally include a performance rule test engine 212. Performance rule test engine 212 represents generally a combination of hardware and programming to execute or run a performance rule test of incorporation of the created component template into a set of electronic document templates. In one example, the set of electronic document templates may be a test set of document templates. Performance rule test engine 212, responsive to receipt of data indicative of a violation of a design rule that was caused by the incorporation of the created component template into a document of the test set of electronic document templates, causes a user notice indicative of the design rule violation to be provided. In examples, the performance rule test may test for errors that occur or become evident as the created component template is incorporated into another document template or is otherwise put to use. In one example, performance rule testing may occur as a development or sandbox testing step. In other examples, performance rule testing may occur as a step in production use of the template. In this example, the performance rule test may test for violation of design rules relative to size or features of the created component template relative to another template that the created template is to be incorporated into or is to appear with. In another example, the performance rule test may test for violation of white space or spacing rules that occur as the created component template is incorporated into or is to appear with another component template. In other examples, the performance rule test may test for violation of other design rules including, but not limited to, design rules regarding fonts, font styles, colors, font size, font effects, character spacing, line spacing, margins, bullet format, numbered paragraph format, page breaks, headers, footers, page numbers, watermarks, page layout, tables, margins, word counts and/or footnotes. In other examples, the performance rule test may test for violation of design rules regarding application or system speed, RAM usage or other memory usage, display clarity, screen flickers of flashes, color, brightness, document crashes, application crashes, system crashes, document lock-up or freeze, application lock-up or freeze, or system lock-up or freeze. In examples, the design rules utilized in the design rule test may be stored as a document at a memory component accessible to system 102 via a network, e.g., link 116.

Document analysis engine 214 represents generally a combination of hardware and programming to obtain a subject document and to analyze the subject document to identify a set of sections in the subject document ("subject document sections"). In examples, the analyzed subject document may be a new document, e.g., a document that has not been previously analyzed to identify sections or to create component templates. In a particular example, the analyzed subject document may be a hard copy document, with the analysis including an image capture of the hard copy document. Document analysis engine 214 is to in turn search the database of component templates to determine that the first component template stored in the database is a duplicate to a first subject document section. Document analysis engine 214 is to then create and store in the database subject component templates for the set of identified subject document sections, except that document analysis engine 214 does not create and store a subject component template for the first subject document section that is a duplicate to the first component template that was already included in the database. In this manner, document analysis engine 214 is to identify subject document content and is to create and to store component templates for such subject document content, while avoiding duplication of efforts and resources where it is determined content of the subject document is already represented by a component template stored in the database.

In examples, identification engine 202 may access the set of electronic document templates to identify common document content, notice engine 204 may cause display of a user notice for first common document content, and/or component template engine 206 may receive data indicative of a user instruction to create a component template and store the component template over a link 116 via a networking protocols. In other examples, dead content engine 208 may cause display of a user alert, design rule test engine 210 may cause provision of user notice indicative of violation or failure of a design test rule, performance rule test engine 212 may cause provision of a user notice indicative of a design rule violation, and/or document analysis engine 214 may search a database to determine that the first component template is a duplicate to a first subject document section, and store component templates for a set of identified subject document sections except for the first subject document section over a link 116 via a networking protocol. In examples the networking protocol may include, but is not limited to, Transmission Control Protocol/Internet Protocol ("TCP/IP"), HyperText Transfer Protocol ("HTTP"), and/or Session Initiation Protocol ("SIP").

As noted above, some embodiments are adapted to identify common document content based on semantic information. Referring to FIG. 3, the semantic information associated with the document content may be determined by identification engine 202 in various ways, such as locally analyzing the content to identify information (e.g., keyphrases or entities) that is contained in the content, or providing the content to a machine learning engine to determine sentiments, topics or other meanings which are associated with the content. Some analyses may require fewer processing resources and may therefore be practically implemented in local analysis components 302.

For instance, if the analysis involves identifying keyphrases, entities or other information that can be extracted from textual document content, it may be possible to provide a look-up table or other database of the terms of interest, and the explicit document content may be searched to identify terms matching the entries of the table. Recognized terms in the document content can be extracted and the terms or other identifiers can be stored for use in comparing different electronic document templates.

If the analysis of the document content involves more complex analyses, it may be more practical to access remote analysis components than to provide the necessary resources locally. In this case, identification engine 202 may provide interfaces 304, through which the identification engine can access the APIs 306 of remote analysis components 308. For instance, analysis of the document to determine the sentiment of a document content item may be performed by a machine learning engine which is external to the identification engine. The machine learning engine may be trained to recognize the sentiment of a content item (i.e., whether the content is more positive or more negative) that is provided by the identification engine (or otherwise identified to the machine learning engine), and to return a value corresponding to the recognized sentiment. The machine learning engine may also (or alternatively) be trained to recognize the topics expressed in a content item and to return the identified topics to the identification engine.

It should be noted that the different semantic analysis components are not limited to the types of implementation described above. In other words, each of the different types of semantic analysis may be implemented using either local or external analysis components. Additionally, the system is not limited to analysis of the four semantic factors specifically enumerated above (sentiment, keyphrase, entities and topics), but may include other factors which may impact the semantic similarity of content items in the different electronic document templates.

When the identification engine has determined the semantic information associated with the various content items within the electronic document templates, it uses this information to determine the similarity of the content items. The similarity of the content items is then used by the identification engine to determine whether two or more electronic document templates have semantically similar (i.e., common) document content. If so user notice is provided and a component template is created and stored as detailed below.

In the foregoing discussion of FIG. 2, engines 202-214 were described as combinations of hardware and programming. Engines 202-214 may be implemented in a number of fashions. Looking at FIG. 4 the programming may be processor executable instructions stored on a tangible memory resource 430 and the hardware may include a processing resource 440 for executing those instructions. Thus memory resource 430 can be said to store program instructions that when executed by processing resource 440 implement system 102 of FIG. 2.

Memory resource 430 represents generally any number of memory components capable of storing instructions that can be executed by processing resource 440. Memory resource 430 is non-transitory in the sense that it does not encompass a transitory signal but instead is made up of one or more memory components to store the relevant instructions. Memory resource 430 may be implemented in a single device or distributed across devices. Likewise, processing resource 440 represents any number of processors capable of executing instructions stored by memory resource 430. Processing resource 440 may be integrated in a single device or distributed across devices. Further, memory resource 430 may be fully or partially integrated in the same device as processing resource 440, or it may be separate but accessible to that device and processing resource 440.

In one example, the program instructions can be part of an installation package that when installed can be executed by processing resource 440 to implement system 102. In this case, memory resource 430 may be a portable medium such as a CD, DVD, or flash drive or a memory maintained by a server from which the installation package can be downloaded and installed. In another example, the program instructions may be part of an application or applications already installed. Here, memory resource 430 can include integrated memory such as a hard drive, solid state drive, or the like.

Figure 4:
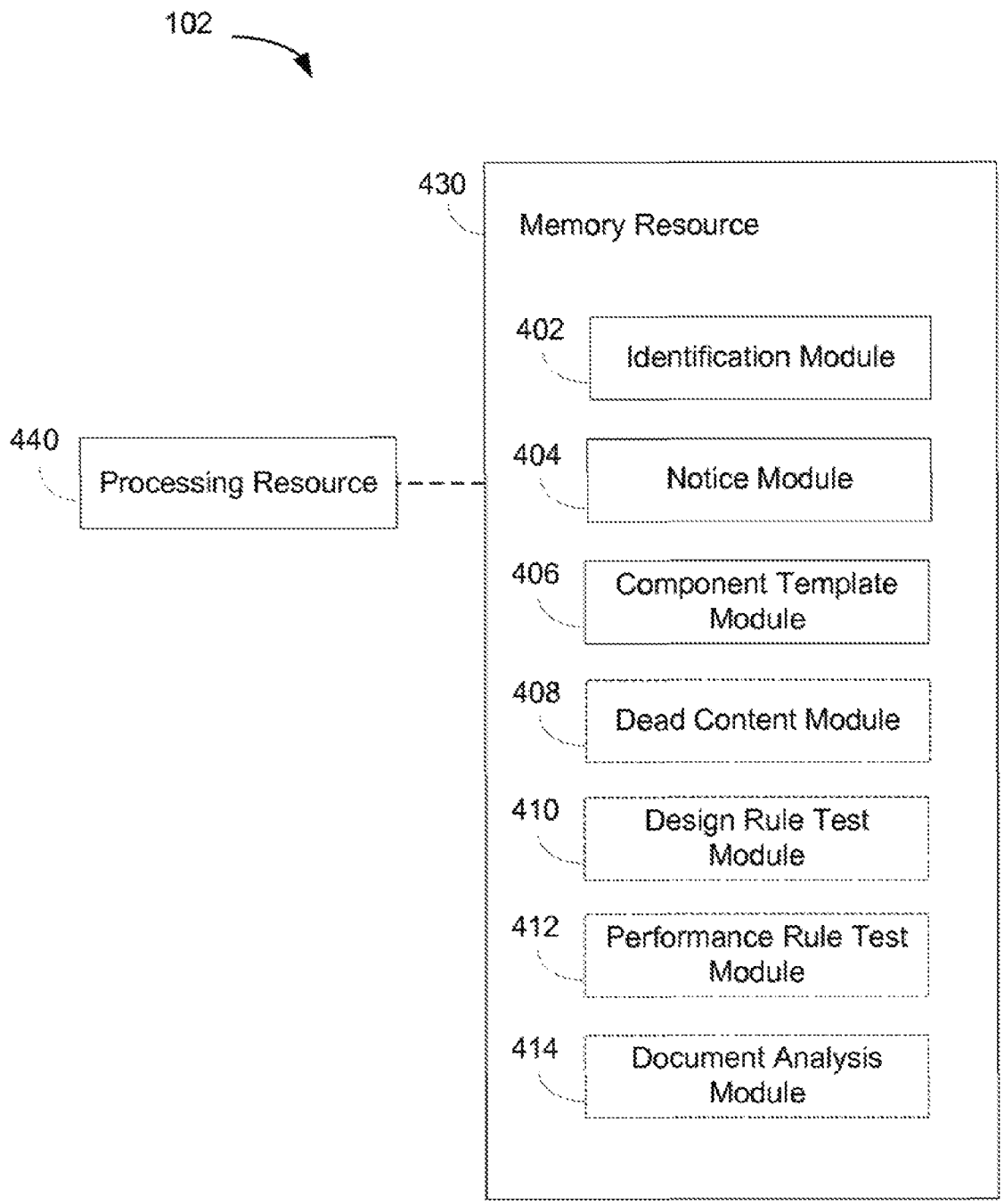
FIG. 4 is a block diagram depicting a memory resource and a processing resource to implement examples of a system to create component templates.

In FIG. 4, the executable program instructions stored in memory resource 430 are depicted as identification module 402, notice module 404, component template module 406, dead content module 408, design rule test module 410, performance rule test module 412, and document analysis module 414. Identification module 402 represents program instructions that when executed by processing resource 440 may perform any of the functionalities described above in relation to identification engine 202 of FIG. 2. Notice module 404 represents program instructions that when executed by processing resource 440 may perform any of the functionalities described above in relation to notice engine 204 of FIG. 2. Component template module 406 represents program instructions that when executed by processing resource 440 may perform any of the functionalities described above in relation to component template engine 206 of FIG. 2. Dead content module 408 represents program instructions that when executed by processing resource 440 may perform any of the functionalities described above in relation to dead content engine 208 of FIG. 2. Design rule test module 410 represents program instructions that when executed by processing resource 440 may perform any of the functionalities described above in relation to design rule test engine 210 of FIG. 2. Performance rule test module 412 represents program instructions that when executed by processing resource 440 may perform any of the functionalities described above in relation to performance rule test engine 212 of FIG. 2. Document analysis module 414 represents program instructions that when executed by processing resource 440 may perform any of the functionalities described above in relation to document analysis engine 214 of FIG. 2.

Illustrative Example

Figure 5:
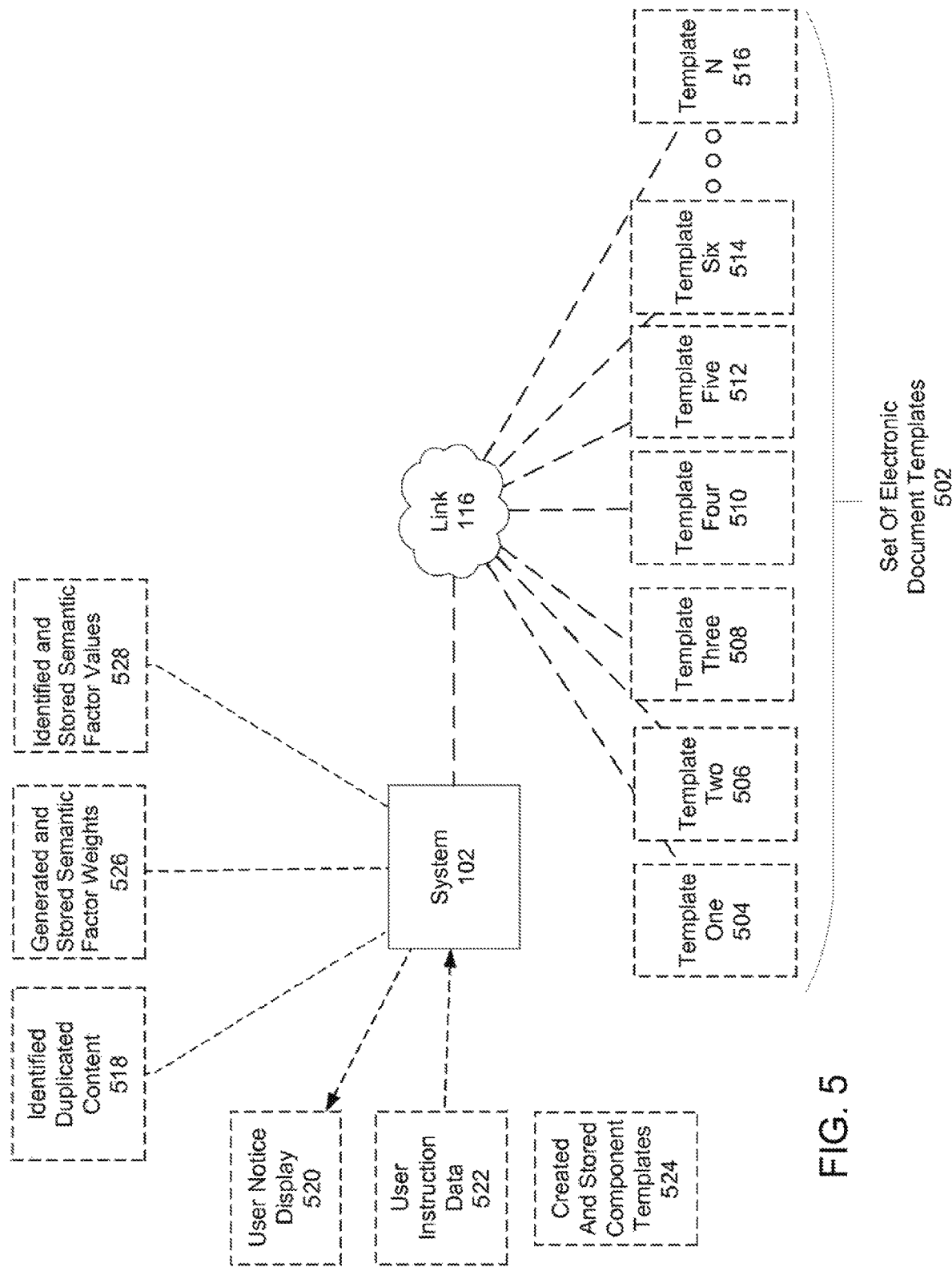
FIG. 5 illustrates an example of a system for creation of component templates.

FIG. 5, in view of FIGS. 1, and 2, illustrates an example of a system 102 for creation of component templates. In examples, system 102 may be hosted at a computing device such as server device 112 (FIG. 1) or distributed over a set of computing devices such as server system 114 (FIG. 1). In examples, system 102 may be included within a cloud server system that is electronically connected to a client computing device 104 via an internet or other network (link 116).

Starting at FIG. 5, in this example system 102 may access a set of electronic document templates 502, the set including Template One 504, Template Two 506, Template Three 508, Template Four 510, Template Five 512, Template Six 514, and Template N 516. In this example, the set of electronic document templates contains templates that may vary according to geography, localization rules, etc. System 102 identifies instances of common document content 518 among the electronic templates of the set 502. System 102 may identify the common content based on various semantic factors 528 which may be normalized or adjusted by weights 526 associated with the semantic factors.

Figure 6:
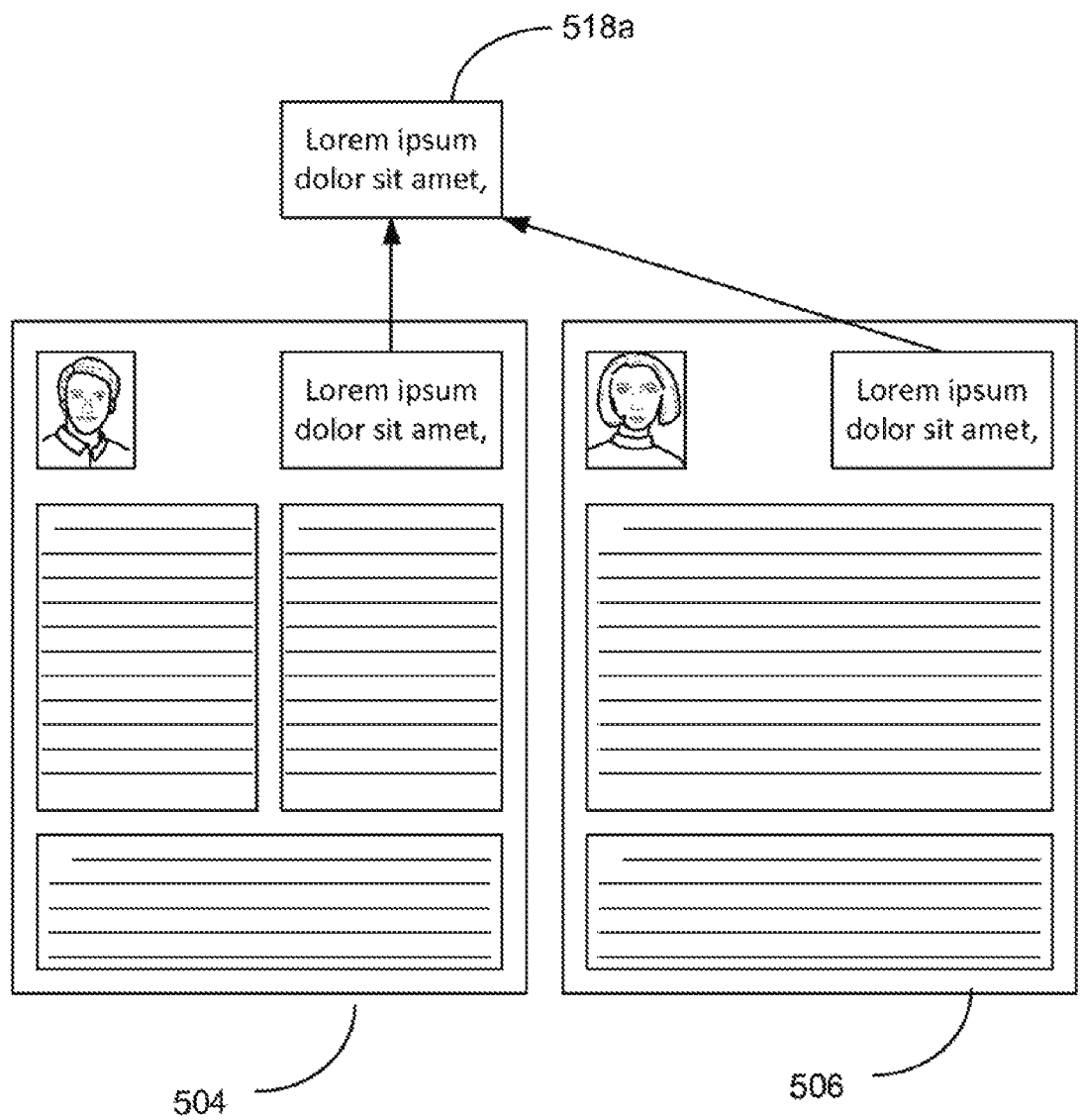
FIGS. 6-9 illustrate examples of component template creation.
Figure 7:
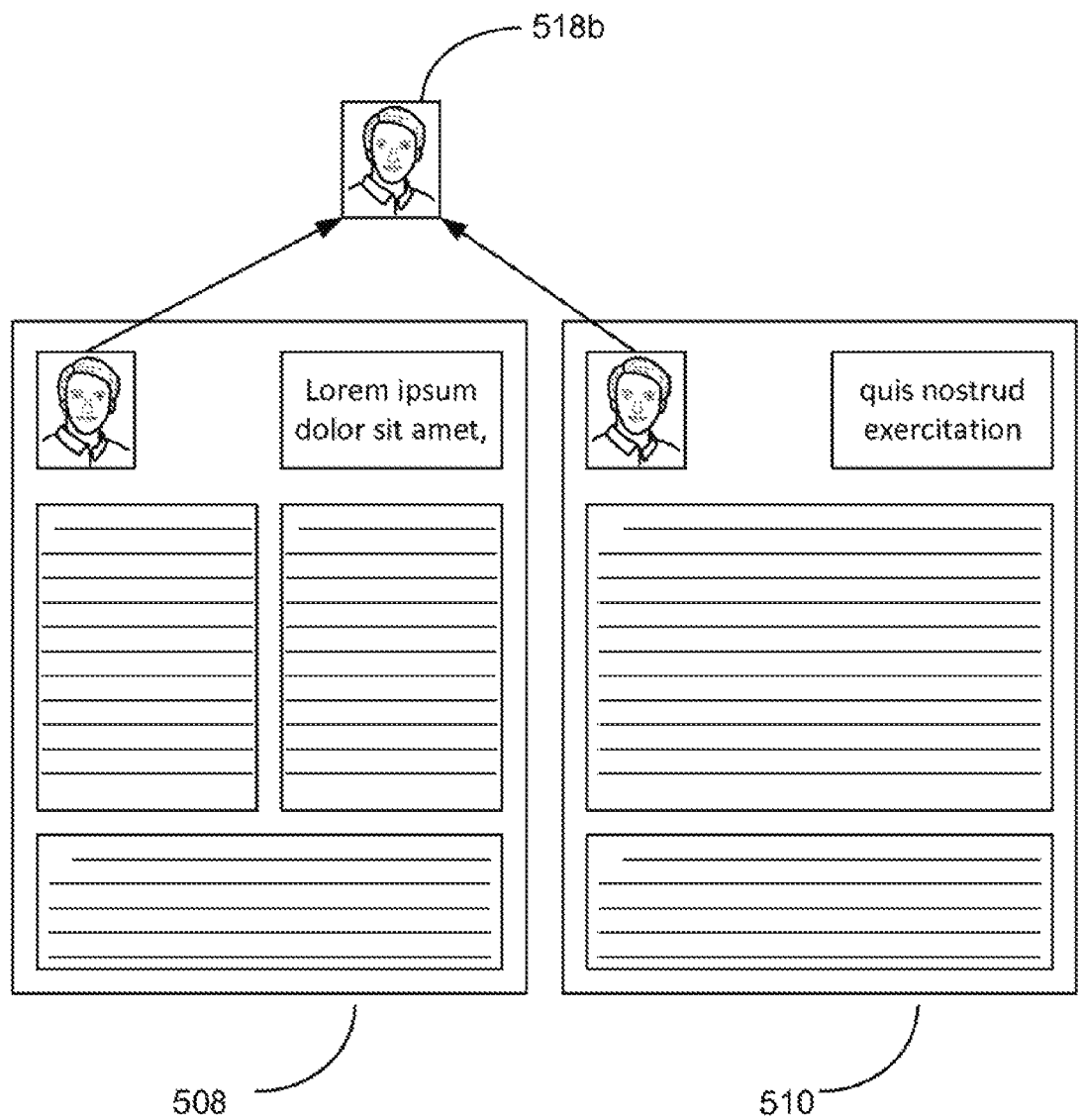
Figure 8:
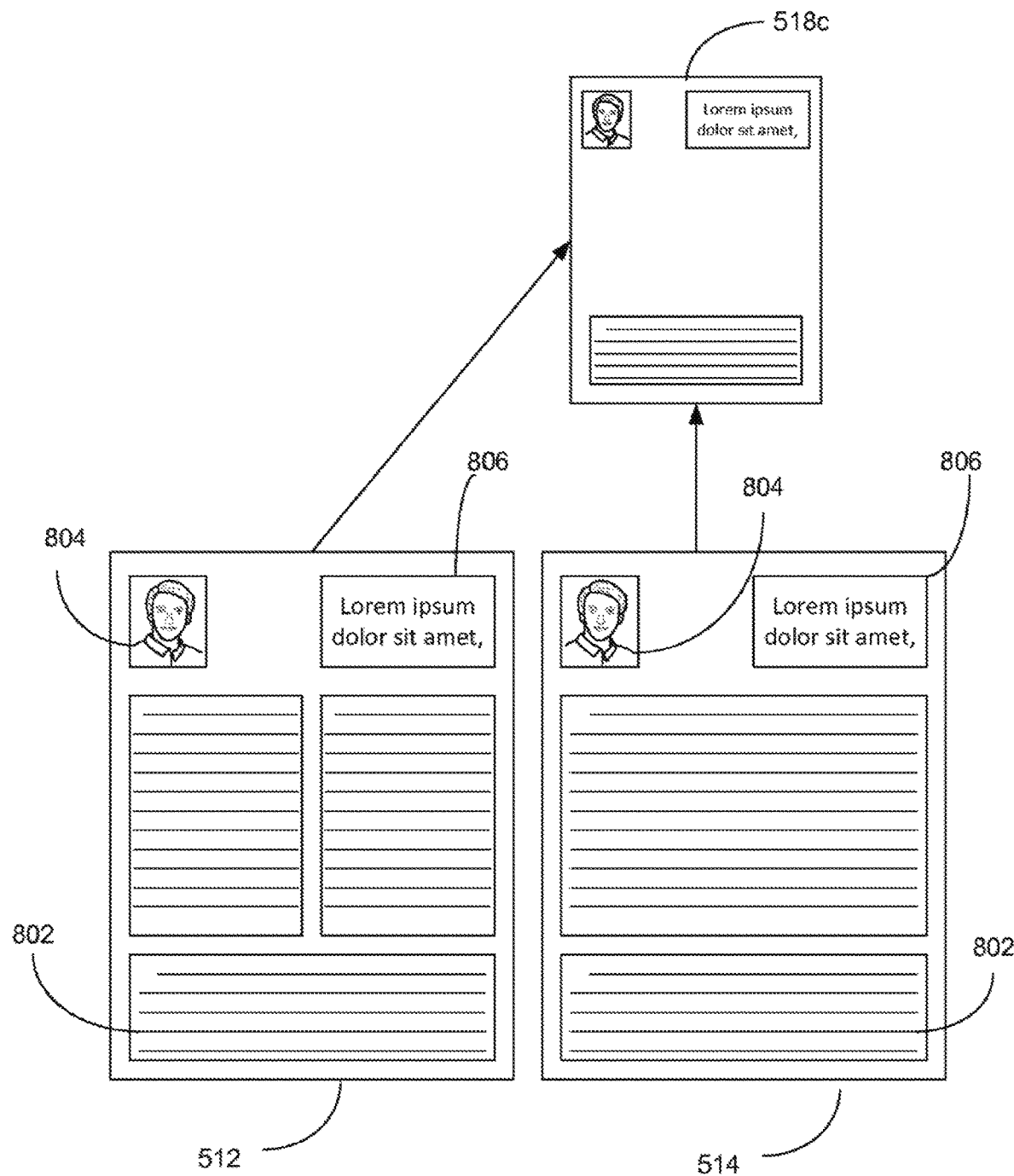
Figure 9:
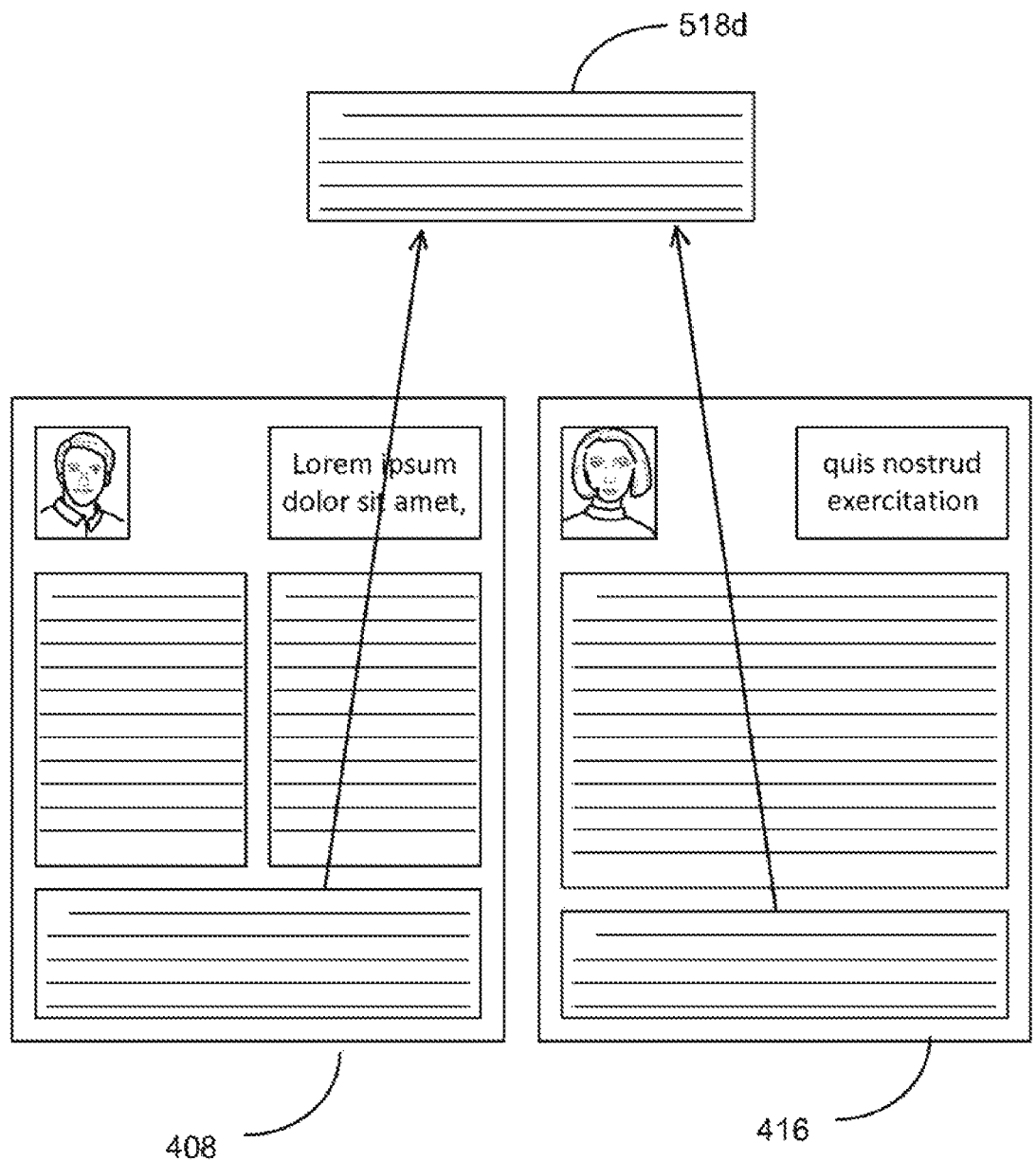

FIG. 6 provides an example wherein system 102 identifies common document content that is duplicated text 518a in Template One 504 and Template Two 506 of the electronic template set 502. FIG. 7 provides an example wherein system 102 identifies duplicate document content that is a duplicated image 518b in Template Three 508 and Template Four 510 of the electronic template set 502. FIG. 8 provides an example wherein system 102 identifies duplicate document content that is a duplicated document structure 518c in Template Five 512 and Template Six 514 of the electronic template set 502. In the particular example of FIG. 8, the duplicate document structure is the common arrangement of a text paragraph 802, an image 804, and a header 806 as between Template Five 512 and Template Six 514. FIG. 9 provides an example wherein system 102 identifies document content that has semantically similar content based on factors such as (but not limited to) similar sentiment, similar entities, similar keyphrases, and similar topics.

The determination of whether the content contained in two documents is identical may involve a simple comparison of the text (or images) of two content items to determine whether there are any differences between them. The process of determining whether two electronic document templates have similar document structure may be somewhat more complex, involving the identification of structural elements (including, but not limited to lines, paragraphs, and sections) within each of the electronic document templates and the determination of whether these structural elements are present in each of the electronic document templates. The process of identifying semantically similar content in the electronic document templates is even more complex, as the content items of the electronic document templates are identified, then the content items are analyzed to identify associated semantic information (e.g., sentiments, recognizable entities, keyphrases, and topics). Then, the semantic information for each content item is analyzed to determine the semantic meaning of the content item. These semantic meanings can then be analyzed in comparison to each other to determine whether they are semantically similar to a degree that a corresponding component template should be created based on the semantic similarity of the content items. If so, notice of the similarity may be provided to a user so that the user can determine whether to initiate creation of the component template. The notice to the user may include a display of the content items that have been determined to be semantically similar so that the user can select one of the content items to be used as the basis for the component template. The user can alternatively revise one of the content items for use in the component template, or can manually create a new content item which is representative of the similar content.

Figure 10:
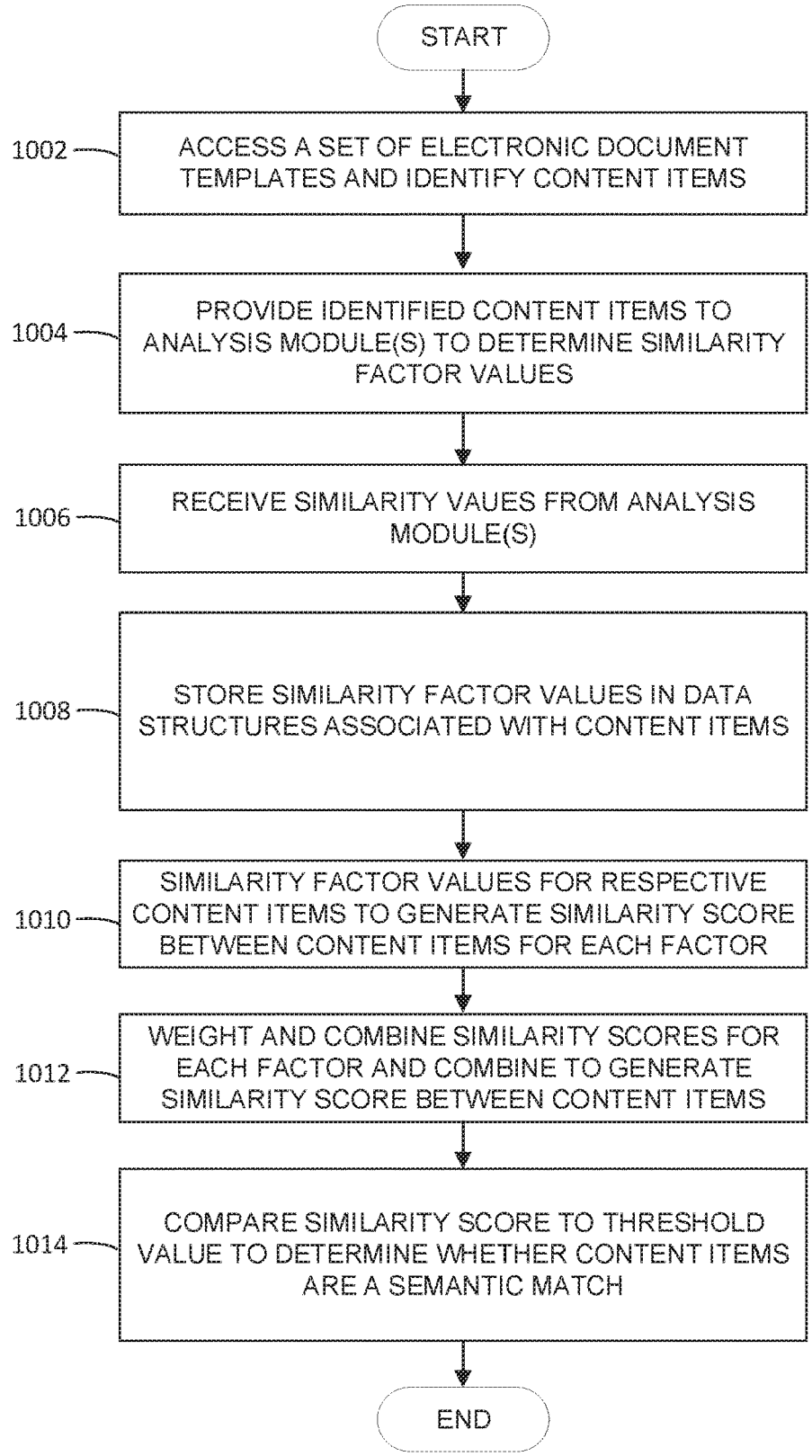
FIG. 10 is a flow diagram depicting an example of a process of creating a component template based on semantically similar content.

An example of the process of creating a component template based on semantically similar content is illustrated in FIG. 10. In this example, content is extracted from two electronic document templates for which semantic similarity is to be determined (block 1002). It should be noted that the step of extracting the content may be performed once, and the identified content may be processed in several different analyses (e.g., identical text/image comparisons, degree-of-similarity text/image analyses, semantic similarity analyses, etc.) In this example, the extracted content is provided to one or more analysis modules which process the content to determine values for one or more semantic similarity factors (block 1004). In one embodiment, separate modules may be provided for each of the analyses (e.g., one module may determine the sentiment of the content, another may recognize entities that are identified in the content, another may identify keyphrases in the content, and another may identify topics that are represented in the content).

Some of the analysis modules may be configured to look up text fragments (e.g., words or phrases) contained in the extracted content to determine whether these fragments comprise known keyphrases that are stored in a database or other data storage structure. Entities in the extracted content may also be compared against a set of known entities that are stored in a corresponding data structure. Analysis modules which are used to identify keyphrases or entities may also be implemented using machine learning engines that are trained to recognize these elements of the content, and may be adapted to be further trained by the content that is processed by the modules as the system is used. In some embodiments, the analysis module that determines the sentiment associated with particular pieces of content uses a machine learning engine which is trained to recognize characteristics of the content that are associated with sentiment (e.g., whether the content is predominantly positive or negative). In some embodiments, the analysis module that identifies topics expressed in the content uses a machine learning engine which is trained to model topics and identify them within the content.

Referring again to FIG. 10, the analysis modules process the extracted content to generate and return corresponding outputs associated with the content (block 1006). For instance, the sentiment analysis may generate a numeric value within a predetermined range which is representative of the sentiment of a processed content item. In one embodiment, for example, the generated value may be normalized to the range from 0 to 1, where a lower value represents a more negative sentiment, and a higher value represents a more positive sentiment. Analysis modules that are configured to identify entities, keyphrases or topics, on the other hand, may provide outputs that comprise or represent the corresponding elements (entities, keyphrases or topics) identified by the respective modules.

The outputs received from the analysis modules for each content item are stored in a data structure corresponding to the content item (block 1008). These stored values effectively comprise an information vector representing the content item. In one embodiment, the data structure for a particular content item includes a value corresponding to the sentiment of the content, a set of entities identified in the content, a set of keyphrases identified in the content, and a set of topics identified in the content.

The similarity of two content items is determined by comparing the respective values associated with a first one of the content items to the values associated with a second one of the content items (block 1010). Thus, the sentiments of the two content items are compared, the identified entities for the two content items are compared, the identified keyphrases for the two content items are compared, and the identified topics for the two content items are compared. For each of the comparisons, a corresponding similarity value is computed which is representative of the semantic similarity between the values of the two content items (or the semantic distance between them) with respect to the corresponding factors. In one embodiment, a closer match between the compared values will be reflected in a lower similarity value to represent a lower semantic distance, while a poorer match will be reflected in a higher similarity value.

The individual similarity values for each of the factors in this embodiment (sentiment, entities, keyphrases and topics) are then used to generate a combined similarity score which is representative of the semantic similarity between the two content items (block 1012). The combined similarity score may be computed in a number of different ways. For example, in one embodiment, the combined similarity score is computed by simply adding the individual similarity values for each of the factors. In another embodiment, the combined similarity score is computed by computing the square root of the sum of the squares of the individual similarity values for each of the factors. Other embodiments may use other computations which involve the different individual similarity values. In any of these computations, the individual similarity values for each of the factors may be multiplied by corresponding weighting factors (e.g., prior to summing them) in order to place greater emphasis and/or to reduce emphasis on some of the factors with respect to the others. Weighting factors may also be used to normalize the individual similarity values for each of the factors so that the combined similarity score will fall within a predetermined range of values.

After the combined similarity score has been generated, the system determines whether this value indicates that the content items are sufficiently similar in terms of the semantic factors that they should be considered to be a semantic match (block 1012). In one embodiment, the system is configured to determine whether the combined similarity score meets a threshold value to determine whether there is a semantic match (block 1014). In the above example in which a lower score represents greater similarity, the system may determine the content items to be a semantic match if the combined similarity score is less than or equal to (or alternatively simply less than) a predetermined threshold value. If the combined similarity score is greater than the threshold, the content items are determined not to be a semantic match. As noted above, weighting factors may be used to normalize the individual similarity values for the different semantic factors (e.g., sentiment, entities, keyphrases and topics) so that the combined similarity score will be within a predetermined range, allowing for easy and consistent determination of the semantic similarity of the content items by comparison to the threshold value.

Returning to FIG. 5, system 102 may cause a display 520 of a user notice for the common document content 518. The user notice may be displayed in response to the determination that two electronic document templates of interest contain common content. If the common content is identical in each of the electronic document templates, the user notice may or may not include the common content. If the common content is not identical, the system may be configured to display the content contained in the electronic document templates which has been determined to be common, so that a user can view the content and determine whether the content is sufficiently similar that a component template for the common content should be generated by the system. The system may also enable the user to select content from one electronic document template or the other to be used in the component template. Still further, the system may enable the user to modify the common content from one of the electronic document templates to be used in the component template, or to create new content for the component template (e.g., new content that is a semantic match for the identified common content, but which is not derived directly from the content contained in either of the compared electronic document templates.

In one embodiment, the display 520 may be caused to occur at a display component that is included in or electronically connected to a client computing device, wherein the client computing device is electronically connected to system 102 via link 116. In this embodiment, a user that views the display 520 of the user notice at the client computing device may interact with a user interface to formulate a user instruction to create a component template for the common text content 518, and to cause the client computing device to send user instruction data 522 to system 102. Upon receipt of the user instruction data 522, system 102 creates and causes a storage of a component template 524 for the common content. In some embodiments, the identification of matching content such as identical text or images automatically triggers creation and storage of a component template for the common content. In certain examples, system 102 may causes the created template 524 to be stored at a database. While this embodiment creates and stores component template 524 in response to user instruction data, some embodiments may be configured to perform these functions automatically in response to determining that the electronic document templates have common document content (e.g., identical content).

Figure 11:
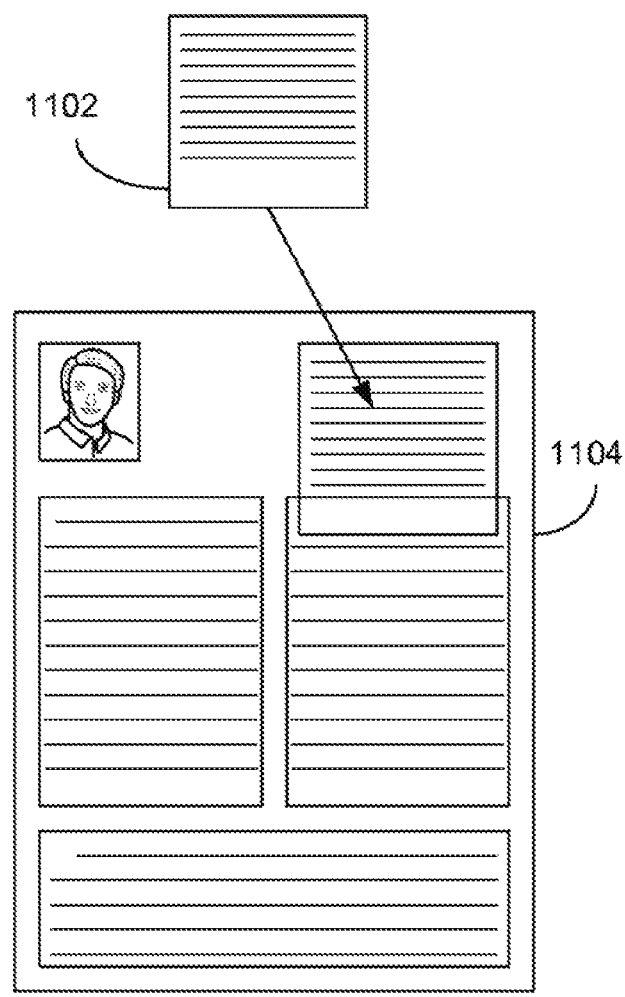
FIG. 11 illustrates an example of component templates creation.

Moving to FIG. 11, system 102 may perform a performance rule test with respect to incorporation of a created first component template 1102 into a second component template 1104. System 102, responsive to determining that incorporation of the created first component template 1102 into the second component template 1104 will violate a design test rule, causes a user notice indicative of the design rule violation to be provided. In this case, system 102 accesses a database of component templates and inspects each template that uses the created first component to look for performance rule violations. In the example of FIG. 11, system 102 determines that the created first component is too large to fit on the page that is the second component template, and in turn sends a user notice of the performance rule violation to a client computing device.

Figure 12:
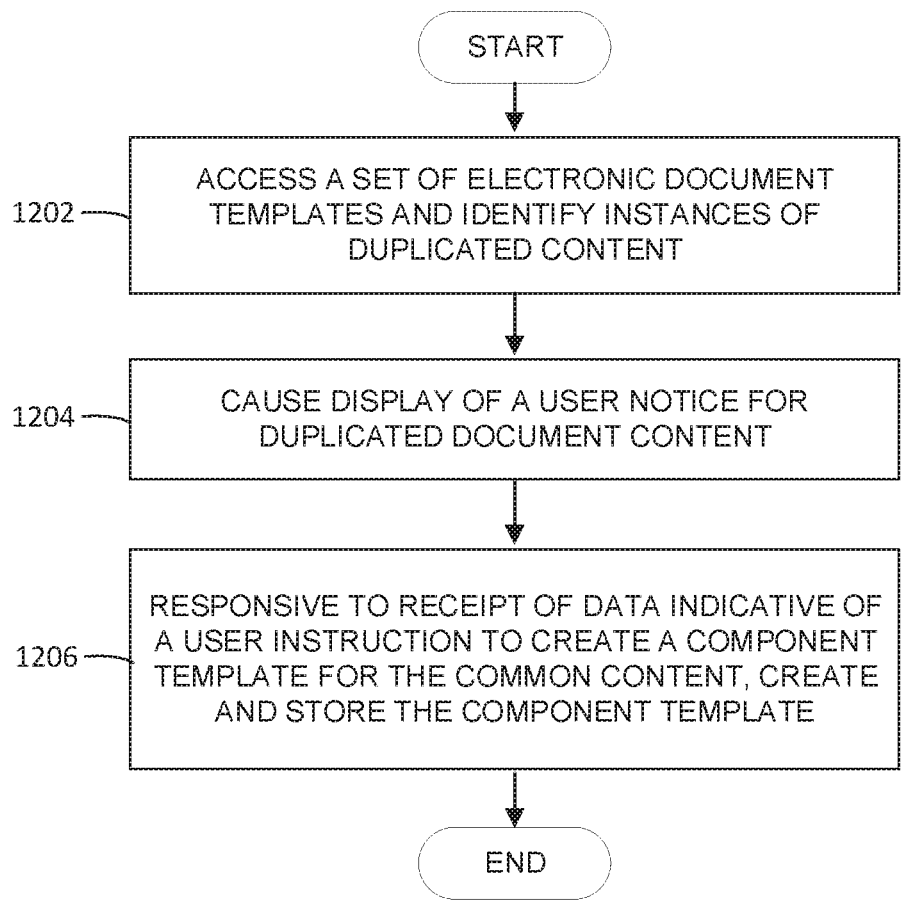
FIG. 12 is a flow diagram depicting implementation of an example of a method for creation of component templates.

Operation:

FIG. 12 is a flow diagram of implementation of a method for creating component templates. In discussing FIG. 12, reference may be made to the components depicted in FIGS. 2 and 4. Such reference is made to provide contextual examples and not to limit the manner in which the method depicted by FIG. 12 may be implemented. A set of electronic document templates is accessed and instances of duplicated document content are identified (block 1202). Referring back to FIGS. 2 and 4, identification engine 202 (FIG. 2) or identification module 402 (FIG. 4), when executed by processing resource 440, may be responsible for implementing block 1202.

In this embodiment, a user notice for first duplicated document content is caused to be displayed (block 1204). Referring back to FIGS. 2 and 4, notice engine 204 (FIG. 2) or notice module 404 (FIG. 4), when executed by processing resource 440, may be responsible for implementing block 1204.

Responsive to receipt of data indicative of a user instruction to create a component template for the first duplicated content, the component template is created and stored (block 1206). Referring back to FIGS. 2 and 4, component template engine 206 (FIG. 2) or component template module 406 (FIG. 4), when executed by processing resource 440, may be responsible for implementing block 1206. The data indicative of the user instruction to create the component template may, in some embodiments, comprise an explicit user instruction or command to create the component template. In some alternative embodiments, it may not be necessary to explicitly provide an instruction or command. The system may instead be configured so that initiation of the process of identifying the duplicated content is taken as an indication of a user instruction to automatically generate a component template when duplicated content is identified.

Figure 13:
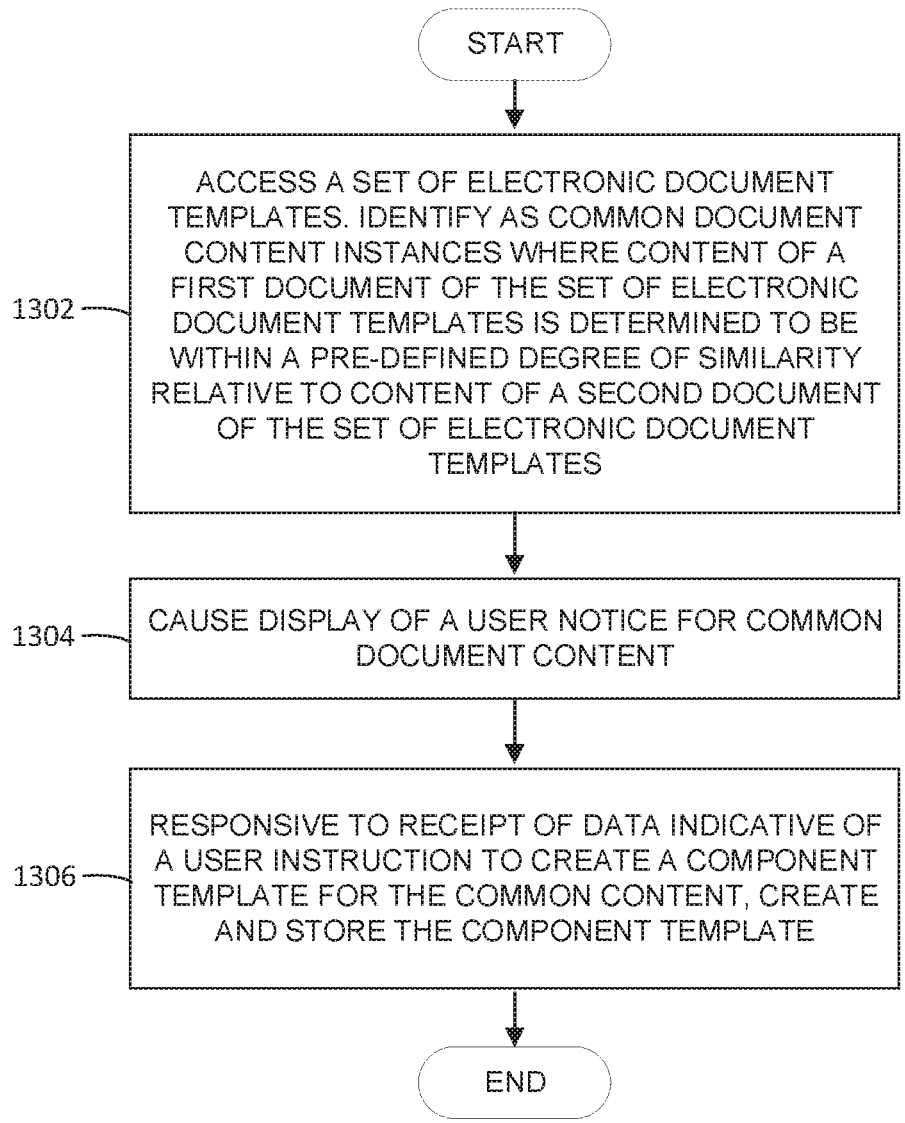
FIG. 13 is a flow diagram depicting implementation of an example of a method to create component templates, the method including identifying duplicated or common document content according to a pre-defined degree of similarity.

FIG. 13 is a flow diagram of implementation of a method for creating component templates, where the method includes identifying common document content based on a pre-defined degree of similarity between content instances. In discussing FIG. 13, reference may be made to the components depicted in FIGS. 2 and 4. Such reference is made to provide contextual examples and not to limit the manner in which the method depicted by FIG. 13 may be implemented.

In this method, a set of electronic document templates is accessed, and instances in which content of a first document of the set of electronic document templates is determined to be within a pre-defined degree of similarity relative to content of a second document of the set of electronic document templates are identified (block 1302). The corresponding content instances in each document template are identified as common document content. Referring back to FIGS. 2 and 4, identification engine 202 (FIG. 2) or identification module 402 (FIG. 4), when executed by processing resource 440, may be responsible for implementing block 1302.

In this embodiment, a display of a user notice for first common document content is provided in response to identifying the instance of common content (block 1304). Referring back to FIGS. 2 and 4, notice engine 204 (FIG. 2) or notice module 404 (FIG. 4), when executed by processing resource 440, may be responsible for implementing block 1304.

In response to receipt of data indicative of a user instruction to create a component template for the first common content, the component template is created and stored (block 1306). Referring back to FIGS. 2 and 4, component template engine 206 (FIG. 2) or component template module 406 (FIG. 4), when executed by processing resource 440, may be responsible for implementing block 1306.

Figure 14:
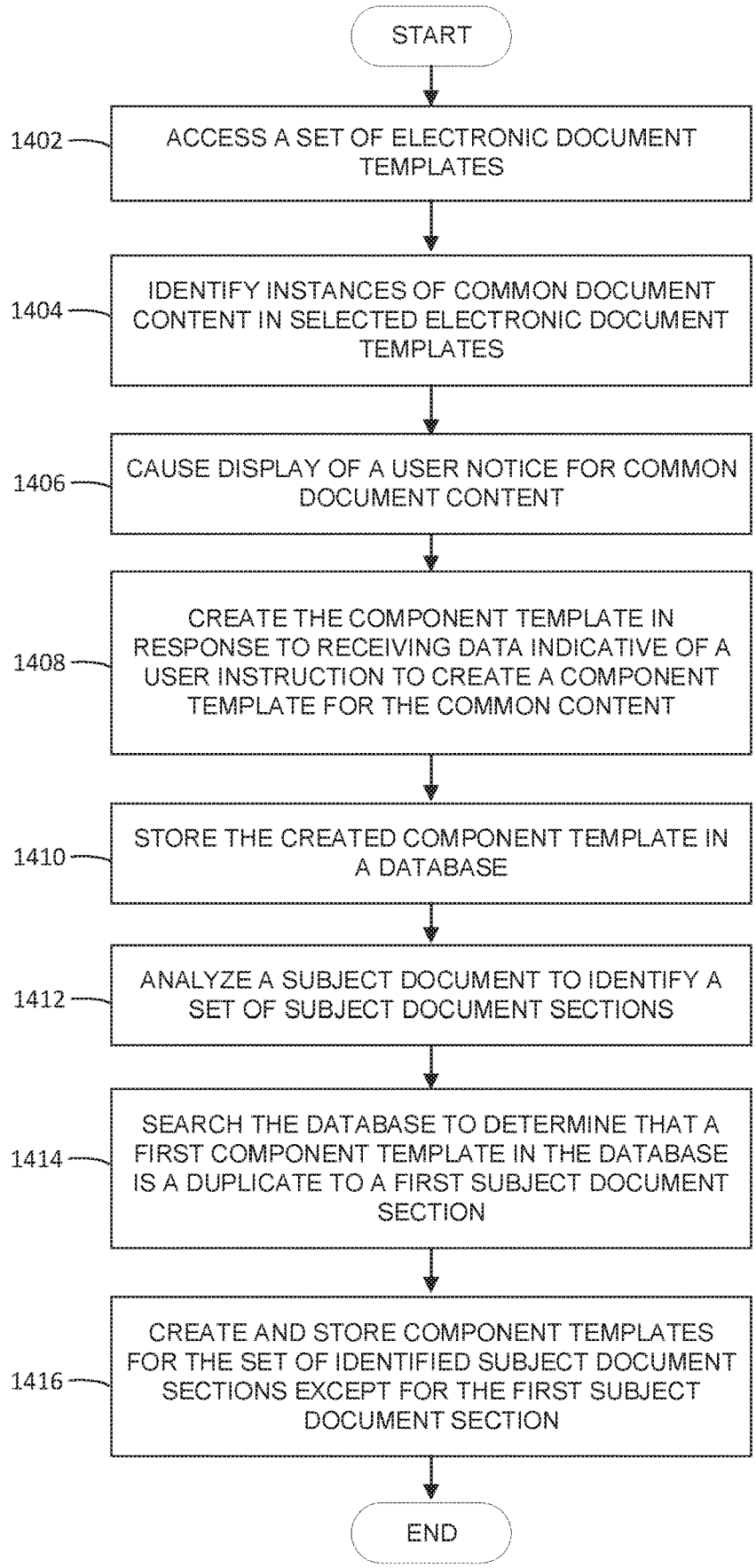
FIG. 14 is a flow diagram depicting implementation of an example of a method for creation of component templates, the method including analyzing a subject document to identify a set of subject document sections and creating and storing component templates for the set of identified subject document sections.

FIG. 14 is a flow diagram of implementation of a method for creation of component templates, the method including analyzing a subject document to identify a set of subject document sections and creating and storing component templates for the set of identified subject document sections. In discussing FIG. 14, reference may be made to the components depicted in FIGS. 2 and 4. Such reference is made to provide contextual examples and not to limit the manner in which the method depicted by FIG. 14 may be implemented.

In the embodiment of FIG. 14, a set of electronic document templates is accessed (block 1402). Referring back to FIGS. 2 and 4, identification engine 202 (FIG. 2) or identification module 402 (FIG. 4), when executed by processing resource 440, may be responsible for implementing block 1402.

Instances of common document content in the set of electronic document templates are then identified (block 1404). Referring back to FIGS. 2 and 4, identification engine 202 (FIG. 2) or identification module 402 (FIG. 4), when executed by processing resource 440, may be responsible for implementing block 1404.

When a first instance of common document content is identified in the set of electronic document templates, a user notice for the first common document content is displayed (block 1406). Referring back to FIGS. 2 and 4, notice engine 204 (FIG. 2) or notice module 404 (FIG. 4), when executed by processing resource 440, may be responsible for implementing block 1406.

In response to the notice, a user may provide an instruction, command or other indicator that a component template is to be created. The component template in this embodiment is created in response to receiving data indicative of the user instruction to create the component template for the first common content (block 1408). Referring back to FIGS. 2 and 4, component template engine 206 (FIG. 2) or component template module 406 (FIG. 4), when executed by processing resource 440, may be responsible for implementing block 1408.

The created component template is stored at a database (block 1410). Referring back to FIGS. 2 and 4, component template engine 206 (FIG. 2) or component template module 406 (FIG. 4), when executed by processing resource 440, may be responsible for implementing block 1410.

A subject document is analyzed to identify a set of subject document sections (block 1412). Referring back to FIGS. 2 and 4, document analysis engine 214 (FIG. 2) or document analysis module 414 (FIG. 4), when executed by processing resource 440, may be responsible for implementing block 1412.

The database is searched to determine that a first component template in the database is a duplicate to a first subject document section (block 1414). Referring back to FIGS. 2 and 4, document analysis engine 214 (FIG. 2) or document analysis module 414 (FIG. 4), when executed by processing resource 440, may be responsible for implementing block 1414.

Component templates for the set of identified subject document sections, except for the first subject document section, are created and stored (block 1416). Referring back to FIGS. 2 and 4, document analysis engine 214 (FIG. 2) or document analysis module 414 (FIG. 4), when executed by processing resource 440, may be responsible for implementing block 1416.

Figure 15:
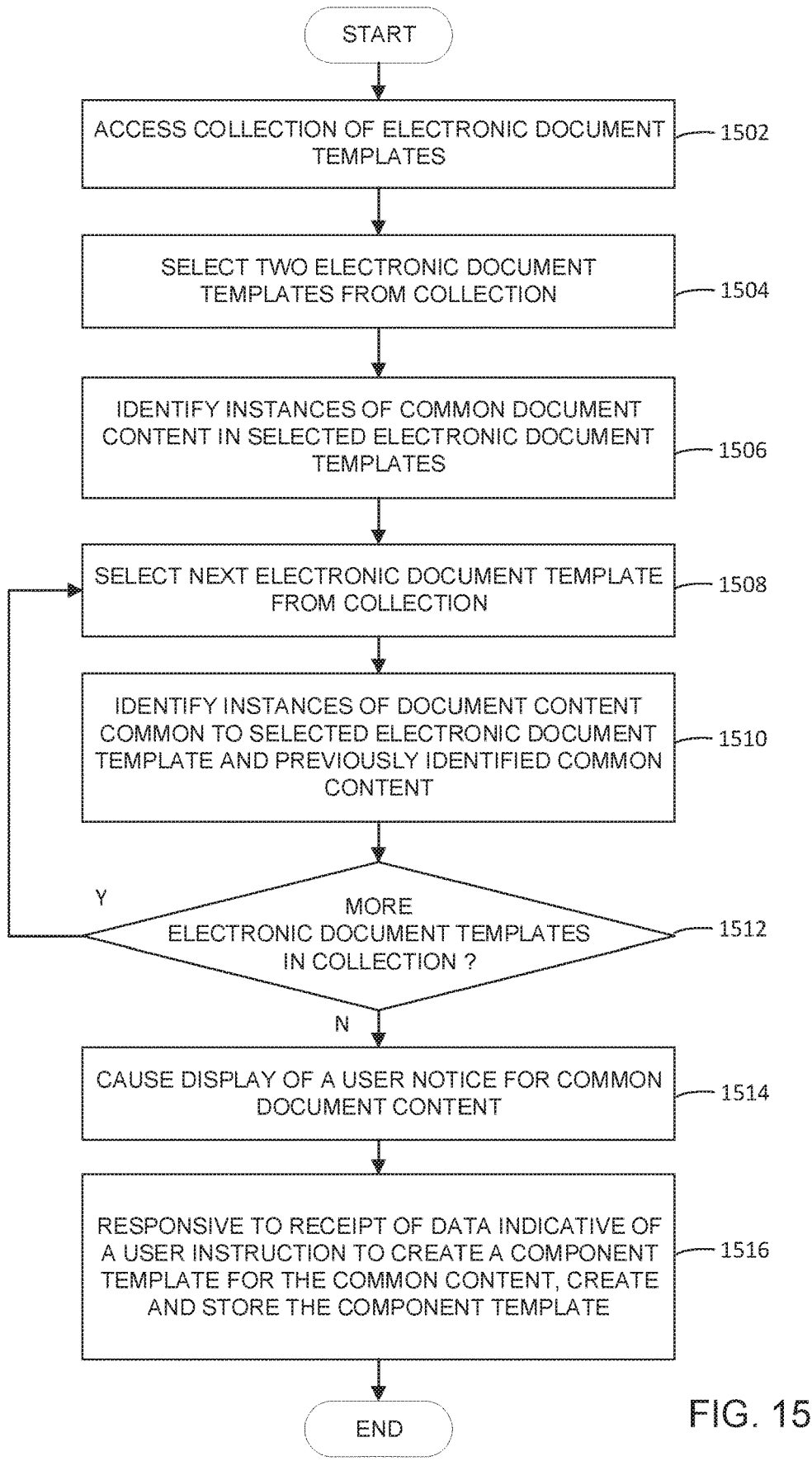
FIG. 15 is a flow diagram depicting implementation of an iterative method for creation of a component template from a collection of documents.

FIG. 15 is a flow diagram of implementation of an iterative method for creation of a component template from a collection of documents, where the component template includes content that is common to each of the documents in the collection. In discussing FIG. 15, reference may be made to the components depicted in FIGS. 2 and 4. Such reference is made to provide contextual examples and not to limit the manner in which the method depicted by FIG. 15 may be implemented.

In the embodiment of FIG. 15, a set of electronic document templates is accessed (block 1502). Identification engine 202 or identification module 402 (FIG. 4), when executed by processing resource 440, may be responsible for implementing block 1502. Identification engine 202 selects two of the electronic document templates (block 1504) and identifies content which is common to each of these electronic document templates (block 1506).

Identification engine 202 then selects a next (i.e., third) one of the electronic document templates from the collection (block 1508) and identifies content which is common to this electronic document template and the content which was previously identified as common to the first two electronic document templates (block 1510).

If there are additional electronic document templates in the collection (block 1512), identification engine 202 selects the next (i.e., fourth) one of the electronic document templates from the collection (block 1508) and identifies content which is common to this electronic document template and the content which was identified as common to the previously considered electronic document templates (block 1510).

This process is repeated until all of the electronic document templates in the collection have been examined and the content which is common to the collection has been identified. After all of the electronic document templates have been analyzed, if common document content in the collection of documents is identified, a user notice for the first common document content is displayed (block 1514). Referring to FIGS. 2 and 4, notice engine 204 (FIG. 2) or notice module 404 (FIG. 4) executed by processing resource 440 may be responsible for implementing this function.

In response to the notice, a user may provide an instruction, command or other indicator that a component template is to be created. The component template in this embodiment is created in response to receiving data indicative of the user instruction to create the component template for the common content (block 1516). The created component template is then stored at a database (block 1516). Referring to FIGS. 2 and 4, component template engine 206 (FIG. 2) or component template module 406 (FIG. 4), when executed by processing resource 440, may be responsible for implementing these functions.

Figure 16:
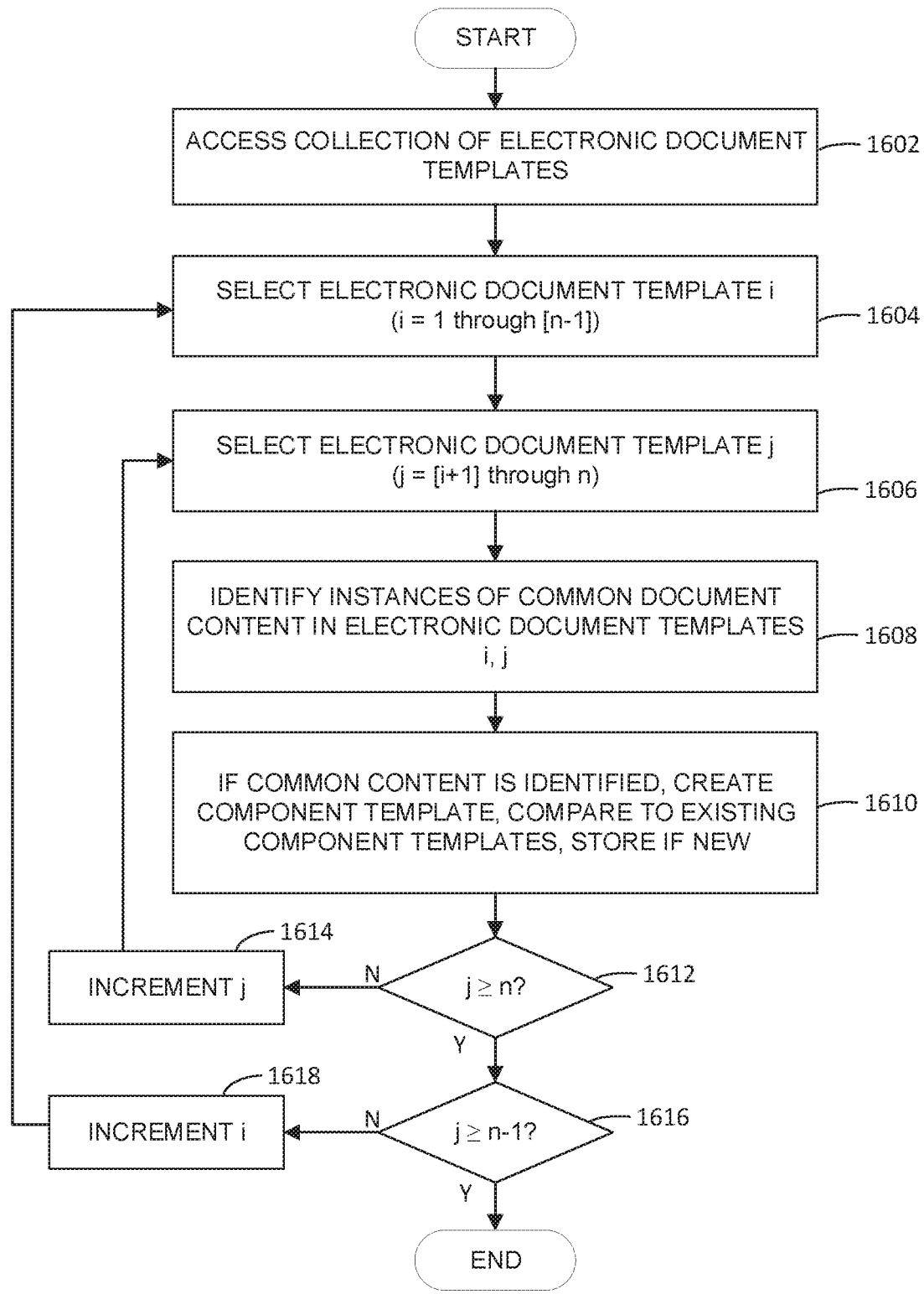
FIG. 16 is a flow diagram depicting an alternative implementation of an iterative method for creation of a component template from a subset of document templates in a collection.

FIG. 16 is a flow diagram illustrating an alternative method for creating component templates from a collection of electronic document templates. In this embodiment, rather than identifying content which is common to all of the document templates in the collection, the method is intended to identify content that is common to a subset of the documents in the collection. This method involves selecting one of the document templates in the collection, iteratively comparing it to the other documents in the collection to identify whether the content of the first document is common to any of the other documents, and generating a component template if the first document is found to have content which is common to one of the other documents. A second one of the electronic document templates in the collection is then selected, and the process is repeated, except that the second document need not be compared to the first document since this comparison has already been made.

As shown in the figure, the collection of electronic document templates is first accessed (block 1602). It is assumed that there is a number (n) of electronic document templates in the collection. A first one of the documents (denoted by the subscript i) is selected (block 1604). Then, a second one of the document templates in the collection is selected as indicated by the subscript j (block 1606). These two documents are compared to identify instances of content which is common to both of the documents (block 1608). If common content is identified, a component template is created for the common content (block 1610). This component template may be compared to any previously generated component templates and may be discarded if it is duplicative (block 1610). Then, a third electronic document template in the collection is selected (blocks 1612-1606) and this process is repeated until the first document template (i) has been compared to each of the other document templates (i+1 through n) in the collection.

After this has been done, the second document template (i+1) is selected (blocks 1616, 1618, 1604) and it is iteratively compared to each of the third through nth document templates, with a component template being generated as needed for any pair of document templates that have common content (blocks 1606-1614). Since the first and second documents have already been compared, it is not necessary to compare them again. This is repeated until each of the document templates and the collection has been compared to each of the other document templates in the collection, any shared content has been identified, and any corresponding component templates have been generated.

Figure 17:
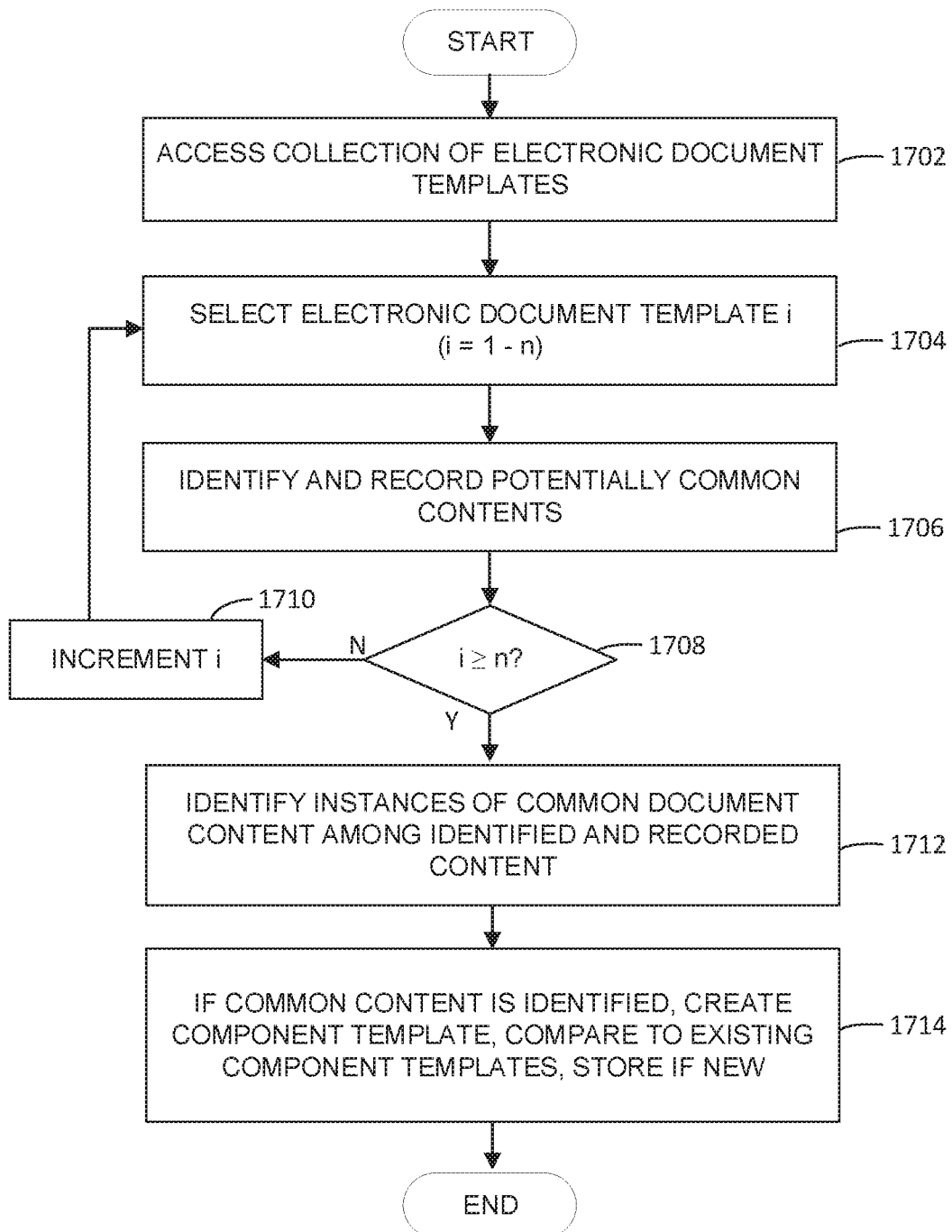
FIG. 17 is a flow diagram depicting another alternative implementation of an iterative method for creation of a component template from a subset of document templates in a collection.

Another alternative method for creating component templates for content that is common to subsets of a collection of electronic document templates is shown in FIG. 17. In this embodiment, rather than individually comparing each of the document templates in the collection with each of the other document templates in the collection, each of the document templates is examined once to identify and record content (e.g., objects or attributes) that is potentially common to other ones of the document templates, and the recorded content is thereafter examined to determine whether any of the content is common to two or more of the document templates.

As depicted in FIG. 17, the collection of electronic document templates is accessed (block 1702) and a first one of the document templates is selected (block 1704). This document is examined to identify content which is potentially common to the other document templates, and the identified content is recorded (block 1706). Then, a next one of the document templates is selected (blocks 1708, 1710, 1704), and potentially common content within this document is identified and recorded (block 1706). When all of the document templates in the collection have been examined and the corresponding potentially common content has been recorded, the identified and recorded content is examined to determine whether any of the content is common to two or more of the document templates in the collection (block 1712). If it is determined that two or more of the document templates share common content, a component template is created corresponding to the common content (block 1714). As noted above, any of the generated component templates may be compared to existing component templates to determine whether they are duplicative, and only new (non-duplicative) component templates are stored (block 1714).

Embodiments of the technology may be implemented on a computing system. Any combination of mobile desktop, server machine, embedded or other types of hardware may be used. One exemplary embodiment may be implemented in a distributed network computing environment. The computing environment in this embodiment includes a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The client computer system may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages) and a server program configured to extend the functionality of the page processing program. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered.

The server computer system may include, for example, a computer processor and associated memory. The computer processor may be an integrated circuit for processing instructions. For example, the processor may comprise one or more cores or micro-cores of a processor. The processor may comprise a CPU. The memory may include volatile memory, non-volatile memory, semi-volatile memory or a combination thereof. The memory, for example, may include RAM, ROM, flash memory, a hard disk drive, a solid state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. A server computer system may also include I/O devices. The server computer system may also include a communication interface, such as a network interface card, to interface with the network.

The memory may store instructions executable by the processor. For example, the memory may include an operating system and application server code. The application server code can be executable to receive requests from client computers, such as the client computer system, generate or server page files from a set of page assets (e.g., complete web pages, page fragments, scripts or other assets) and return page files in response. A page file may reference additional resources, such as style sheets, images, videos, audio, scripts or other resources at the server computer system or at other network locations, such as at additional server systems.

According to one embodiment, the network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for creation of component templates, comprising:
    an identification engine configured to access a set of electronic document templates and identify semantically similar content instances contained in two or more electronic document templates of the set of electronic document templates, wherein for each of a plurality of content instances in the set of electronic document templates, corresponding values representing one or more semantic factors are determined, wherein for each of the one or more semantic factors, the corresponding values of each of the content instances are compared to determine a degree of similarity of the content instances with respect to the semantic factor, and wherein an overall degree of similarity between the content instances is determined based on the degrees of similarity with respect to each of the semantic factors; and
    a component template engine configured to, responsive to receipt of data indicative of a user instruction, create the component template corresponding to the two or more electronic document templates of the set of electronic document templates, wherein the component template contains the semantically similar content instances identified in the two or more electronic document templates and is configured to enable new documents to be generated therefrom, and store the component template.

2. The system of claim 1, wherein the identification engine is configured to, for each electronic document template of the set of electronic document templates:
    analyze content therein and thereby
        determine a sentiment associated with the electronic document template,
        recognize entities identified in the electronic document template,
        identify keyphrases contained in the electronic document template, and
        identify topics contained in the electronic document template; and
    identify semantically similar content instances by comparing the identified sentiments, the recognized entities, the identified keyphrases, and the identified topics in each electronic document template of the set of electronic document templates.

3. The system of claim 2, wherein identifying the semantically similar content instances comprises computing a semantic distance between two electronic document templates of the set of electronic document templates, wherein the semantic distance is determined based on one or more of:

a first similarity value representative of a similarity between sentiments associated with the two electronic document templates of the set of electronic document templates, a second similarity value representative of recognized entities identified in the two electronic document templates of the set of electronic document templates, a third similarity value representative of a similarity between identified keyphrases contained in the two electronic document templates of the set of electronic document templates, and a fourth similarity value representative of a similarity between identified topics contained in the two electronic document templates of the set of electronic document templates.

4. The system of claim 1, wherein the identification engine is configured to, for each of the content instances, store the values for each of the one or more semantic factors in a corresponding vector.

5. The system of claim 4, wherein the overall degree of similarity between the content instances is determined by comparing the respective semantic factor values of the vectors corresponding to the content instances, determining the degree of similarity of the content instances with respect to each semantic factor, and summing the degrees of similarity of the content instances for all of the semantic factors to generate an overall similarity score.

6. The system of claim 5, wherein, for each of the vectors corresponding to the content instances, the value for each semantic factor is multiplied by a weighting factor corresponding to the semantic factor.

7. The system of claim 5, wherein the overall similarity score between the content instances is compared to a threshold similarity value and the content instances are determined to be similar if the overall similarity score meets or exceeds the threshold similarity value.

8. A memory resource storing instructions that when executed cause a processing resource to create component templates, the instructions comprising:

an identification module that when executed causes the processing resource to access a set of electronic document templates and identify semantically similar content instances contained in two or more electronic document templates of the set of electronic document templates, wherein for each of a plurality of content instances in the set of electronic document templates, corresponding values representing one or more semantic factors are determined, wherein for each of the one or more semantic factors, the corresponding values of each of the content instances are compared to determine a degree of similarity of the content instances with respect to the semantic factor, and wherein an overall degree of similarity between the content instances is determined based on the degrees of similarity with respect to each of the semantic factors; and a component template module that when executed causes the processing resource to, responsive to receipt of data indicative of a user instruction, create the component template corresponding to the two or more electronic document templates of the set of electronic document templates, wherein the component template contains semantically similar content instances identified in the two or more electronic document templates and is configured to enable new documents to be generated therefrom, and store the component template.

9. The memory resource of claim 8, wherein the identification module is configured to analyze, for each electronic document template of the set of electronic document templates, content therein and determine a sentiment associated with the electronic document template, wherein the identification module is configured to identify semantically similar content instances by comparing at least the sentiment associated with each electronic document template of the set of electronic document templates.

10. The memory resource of claim 8, wherein the identification module is configured to analyze, for each electronic document template of the set of electronic document templates, content therein and recognize entities identified therein, wherein the identification module is configured to identify semantically similar content instances by comparing at least the recognized entities identified in each electronic document template of the set of electronic document templates.

11. The memory resource of claim 8, wherein the identification module is configured to analyze, for each electronic document template of the set of electronic document templates, content therein and identify keyphrases contained therein, wherein the identification module is configured to identify semantically similar content instances by comparing at least the identified keyphrases in each electronic document template of the set of electronic document templates.

12. The memory resource of claim 8, wherein the identification module is configured to analyze, for each electronic document template of the set of electronic document templates, content therein and identify topics contained therein, wherein the identification module is configured to identify semantically similar content instances by comparing at least the identified topics in each electronic document template of the set of electronic document templates.

13. The memory resource of claim 8, wherein the identification module is configured to, for each electronic document template of the set of electronic document templates, analyze content therein and thereby determine a sentiment associated with the electronic document template, recognize entities identified in the electronic document template, identify keyphrases contained in the electronic document template, and identify topics contained in the electronic document template;

identify semantically similar content instances by comparing the identified sentiments, the recognized entities, the identified keyphrases, and the identified topics in each electronic document template of the set of electronic document templates.

14. The memory resource of claim 13, wherein identifying the semantically similar content instances comprises computing a semantic distance between two electronic document templates of the set of electronic document templates, wherein the semantic distance is determined based on one or more of:

a first similarity value representative of a similarity between sentiments associated with the two electronic document templates of the set of electronic document templates, a second similarity value representative of recognized entities identified in the two electronic document templates of the set of electronic document templates, a third similarity value representative of a similarity between identified keyphrases contained in the two electronic document templates of the set of electronic document templates, and a fourth similarity value representative of a similarity between identified topics contained in the two electronic document templates of the set of electronic document templates.

15. A method to create component templates, comprising:
accessing a set of electronic document templates;
identifying semantically similar content instances contained in two or more electronic document templates of the set of electronic document templates, wherein for each of a plurality of content instances in the set of electronic document templates, corresponding values representing one or more semantic factors are determined, wherein for each of the one or more semantic factors, the corresponding values of each of the content instances are compared to determine a degree of similarity of the content instances with respect to the semantic factor, and wherein an overall degree of similarity between the content instances is determined based on the degrees of similarity with respect to each of the semantic factors;
responsive to receipt of data indicative of a user instruction,
creating the component template corresponding to the two or more electronic document templates of the set of electronic document templates, wherein the component template contains the semantically similar content instances identified in the two or more electronic document templates and is configured to enable new documents to be generated therefrom, and
storing the component template.

16. The method of claim 15, wherein identifying the semantically similar content instances comprises analyzing, for each electronic document template of the set of electronic document templates, content therein and determining a sentiment associated with each electronic document template, and comparing at least the sentiment associated with each electronic document template of the set of electronic document templates.

17. The method of claim 15, wherein identifying the semantically similar content instances comprises analyzing, for each electronic document template of the set of electronic document templates, content therein and identifying entities contained therein, and comparing at least the identified entities contained in each electronic document template of the set of electronic document templates.

18. The method of claim 15, wherein identifying the semantically similar content instances comprises analyzing, for each electronic document template of the set of electronic document templates, content therein and identifying keyphrases contained therein, and comparing at least the identified keyphrases contained in each electronic document template of the set of electronic document templates.

19. The method of claim 15, wherein identifying the semantically similar content instances comprises analyzing, for each electronic document template of the set of electronic document templates, content therein and identifying topics contained therein, and comparing at least the identified topics contained in each electronic document template of the set of electronic document templates.

20. The method of claim 15, further comprising:
analyzing, for each electronic document template of the set of electronic document templates, content therein and thereby
determining a sentiment associated with the electronic document template,
recognizing entities identified in the electronic document template,
identifying keyphrases contained in the electronic document template, and
identifying topics contained in the electronic document template;
identifying semantically similar content instances by comparing the identified sentiments, the recognized entities, the identified keyphrases, and the identified topics in each electronic document template of the set of electronic document templates;
wherein identifying the semantically similar content instances comprises computing a semantic distance between two electronic document templates of the set of electronic document templates, wherein the semantic distance is determined based on one or more of:
a first similarity value representative of a similarity between sentiments associated with the two electronic document templates of the set of electronic document templates,
a second similarity value representative of recognized entities identified in the two electronic document templates of the set of electronic document templates,
a third similarity value representative of a similarity between identified keyphrases contained in the two electronic document templates of the set of electronic document templates, and
a fourth similarity value representative of a similarity between identified topics contained in the two electronic document templates of the set of electronic document templates.

* * * * *